United States Patent
Lee et al.

(10) Patent No.: US 7,072,891 B2
(45) Date of Patent: Jul. 4, 2006

(54) APPARATUS AND METHOD FOR HYPER-RECTANGLE BASED MULTIDIMENSIONAL DATA SEGMENTATION AND CLUSTERING

(75) Inventors: Seok-Lyong Lee, Yongin-si (KR); Seok-Ju Chun, Seoul (KR); Deok-Hwan Kim, Seoul (KR); Chin-Wan Chung, Taejon (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 253 days.

(21) Appl. No.: 10/106,076

(22) Filed: Mar. 22, 2002

(65) Prior Publication Data

US 2003/0097385 A1      May 22, 2003

(30) Foreign Application Priority Data

Oct. 17, 2001    (KR)    ............................... 2001-64074

(51) Int. Cl.
    *G06F 17/30* (2006.01)
(52) U.S. Cl. ............................................. 707/6; 707/3
(58) Field of Classification Search .................... 707/1, 707/100, 3, 6, 102, 10, 4.1; 382/100
    See application file for complete search history.

(56) References Cited

U.S. PATENT DOCUMENTS

| | | | | |
|---|---|---|---|---|
| 5,579,444 A | * | 11/1996 | Dalziel et al. ............... | 700/259 |
| 5,832,182 A | * | 11/1998 | Zhang et al. .................. | 706/50 |
| 6,134,541 A | * | 10/2000 | Castelli et al. .................. | 707/3 |
| 6,345,112 B1 | * | 2/2002 | Summers et al. ........... | 382/128 |
| 6,470,344 B1 | * | 10/2002 | Kothuri et al. ............. | 707/100 |
| 6,601,062 B1 | * | 7/2003 | Deshpande et al. ............ | 707/3 |
| 6,674,894 B1 | * | 1/2004 | Parker et al. ............... | 382/154 |
| 6,718,054 B1 | * | 4/2004 | Lorigo et al. ............... | 382/128 |

OTHER PUBLICATIONS

Ester et al.; "A Density-Based Algorithm for discovering Clusters in Large Spatial Databases with Noise", published in Proceedings of 2nd International Conference on Knowledge Discovery and Data Mining (KDD-96).*

An article entitled "CURE: An Efficient Clustering Algorithm for Large Databases," By Guha et al. This article discloses an efficient clustering algorithm for large databases.

An article entitled, "Fast Algorithms For Projected Clustering", By Aggarwal et al., pp. 61-72. This article discloses fast algorithms for projected clustering.

An article entitled, "A Density-Based Algorithm for . . . ," By Ester et al., published Proceedings of 2nd International Conference on Knowledge Discovery and Data Mining (KDD-96). This article discloses a density-based algorithm for discovering clusters in large spatial databases with noise.

* cited by examiner

*Primary Examiner*—Leslie Wong
(74) *Attorney, Agent, or Firm*—Bachman & LaPointe, P.C.

(57) ABSTRACT

An apparatus and method for performing similarity searches using hyper-rectangle based multidimensional data segmentation partitions a data set representable by a multidimensional data sequence, such as a video stream, into segments in consideration of the temporal relationship between points, and groups similar segments in one sequence into the same cluster so as to efficiently search a database for a multidimensional data sequence similar to a given query sequence.

16 Claims, 10 Drawing Sheets

(a) Inclusion (b) Intersection (c) Disjunction

Fig. 5

```
ALGORITHM VDCluster
INPUT : SEQUENCE (MDS) SET, minPts
OUTPUT : VIDEO CLUSTER SET VC,
         OUTLIER SET O
STEP 0 :  /*INITIALIZATION*/
          VC ← ∅ , O ← ∅
STEP 1 :  for each MDS $S_i$ in the data set (1 ≤ i ≤ N)
              $VS_i$, $O_i$ ← VIDEO SEGMENTATION ($S_i$, minPts)
              O ← O ∪ $O_i$
              $VC_i$ ← VIDEO CLUSTERING ($VS_i$)
              VC ← VC ∪ $VC_i$
          end for
STEP 2 :  return set VC, set O
```

APPARATUS AND METHOD FOR HYPER-RECTANGLE BASED MULTIDIMENSIONAL DATA SEGMENTATION AND CLUSTERING

BACKGROUND OF THE INVENTION

1. Field of the Invention

The present invention relates generally to an apparatus and method for hyper-rectangle based multidimensional data segmentation and clustering, and more particularly to an apparatus and method which can efficiently perform segmentation and clustering with respect to data sets representable by multidimensional data sequences (MDS's), such as video streams.

2. Description of the Prior Art

For the past several years, time-series data have been thoroughly studied in database applications such as data mining and dataware housing. Time-series data are a series of real numbers, which represent values at time points. For example, the time-series data can be a sequence of real numbers such as the prices of stocks or commercial goods, weather patterns, sales indicators, biomedical measurements, and etc.

The examples of the time-series data are disclosed in detail in a thesis entitled "Similarity-Based queries for time series data" (May, 1997) by "D. Rafei, A. Medelzon" and published in "Proceedings of ACM SIGMOD Int'l Conference on Management of Data". However, because such example values are basically one-dimensional data, most research still concentrates on indexes and searches for one-dimensional data sequences.

As the use of multimedia data has spread to many application domains, the efficient representation of multidimensional, voluminous and complex information, which are the intrinsic characteristics of multimedia data, is becoming increasingly important. The present invention, as described later, belongs to clustering technology areas for data represented by sequences, such as time-series data and multimedia data, in accordance with this representation requirement.

Meanwhile, video information processing is one of areas difficult to handle in spite of its utility, because it requires huge amounts of storage space and processing power. In order to overcome such difficulties, it is essential that the video data should be effectively represented, stored and retrieved.

Video data sets are collections of video clips each having a running time ranging from several seconds to several minutes. Here, each video clip can be represented by a multidimensional data sequence (MDS), and each MDS is partitioned into segments in consideration of the temporal relationship between points. In this case, similar segments are grouped again into clusters in one sequence. Accordingly, each sequence is represented by a small number of clusters.

Meanwhile, a clustering problem has been considerably studied in many database applications such as customer segmentation, sales analysis, pattern recognition and similarity search. The task of clustering data points is defined as follows: "Given a set of points in a multidimensional space, partition the points into clusters such that points within each cluster have similar characteristics while points in different clusters are dissimilar. At this time, a point that is considerably dissimilar to or inconsistent with the remainder of the data is referred to as an outlier."

Currently, clustering methods are extensively studied, however, a clustering method for sequence should be handled in a way different from the conventional clustering methods in various respects.

First, the temporal relationship between points must be considered in sequence clustering.

Second, in conventional methods, one object as a target to be clustered is represented by one point and thus belongs to a single cluster, while in the sequence clustering method, one object is represented by multiple points, such that the points belong to multiple separate clusters.

Third, the shapes of the clusters may also be considered differently. Conventional clustering methods tend to focus on the cluster's own quantitative property, independent of how the clusters will be utilized in the future. In other words, conventional clustering methods concentrate on the problem of determining a certain number of clusters for optimizing given criteria such as the Mean Square Error (MSE). Therefore, the shapes of clusters are determined arbitrarily according to the distribution of points in the data space. On the contrary, sequence storage and retrieval in the future must be considered along with the clustering itself, such that these considerations must be reflected on the sequence clustering.

Conventional methods for clustering data points in a multidimensional space can include the following methods.

First, there is a method named "CLARANS" proposed in a thesis entitled "Efficient and effective clustering methods for spatial data mining" by "R. T. Ng and J. Han" and published in "Proceedings of Int'l Conference on Very Large Data Bases". The CLARANS method is based on a randomized search method and achieves its efficiency by reducing the search space using two user-supplied input parameters.

Second, there is a method named "BIRCH" proposed in a thesis entitled "BIRCH: An efficient data clustering method for very large databases" by "T. Zhang, R. Ramakrishnan, and M. Livny" and published in "Proceedings of ACM SIGMOD Int'l Conference on Management of Data". The "BIRCH" method is a multiphase clustering method for constructing a hierarchical data structure called CF (clustering feature)-tree by scanning a database. Further, the BIRCH uses an arbitrary clustering algorithm so as to cluster leaf nodes of the CF-tree. Such a method is the first approach that effectively handles outliers in the database area.

Third, there is a method named "DBSCAN" proposed in a thesis entitled "A density-based algorithm for discovering clusters in large spatial databases with noise" by "M. Ester, H. P. Kriegel, J. Sander, and X. Xu" and published in "Int'l Conference on Knowledge Discovery in Databases and Data Mining". The "DBSCAN" method tries to minimize requirements of domain knowledge to determine input parameters and provides arbitrary shapes of clusters based on the distribution of data points. The basic idea of the method is that for each point in a cluster, the neighborhood of the point within a given radius should contain at least a given number of points. Therefore, the method requires only two input parameters (i.e., radius and the minimum number of points).

Fourth, there is a method named "CLIQUE" proposed in a thesis entitled "Automatic subspace clustering of high dimensional data for data mining applications" by "R. Agrawal, J. Gehrke, D. Gunopulos, and P. Raghavan" and published in "Proceedings of ACM SIGMOD Int'l Conference on Management of Data". "CLIQUE" is a method for automatically identifying dense clusters in subspaces of a given high-dimensional data space. That is, the method is suitable where even though a cluster is not detected in a given space, the cluster can exist in the subspaces. Further, the method needs the size of the grid for partitioning the space and the global density threshold for clusters as the input parameters.

Fifth, there is a method named "CURE" proposed in a thesis entitled "CURE: An efficient clustering algorithm for large databases" by "S. Guha, R. Rastogi, and Shim" and published in "Proceedings of ACM SIGMOD Int'l Conference on Management of Data". The "CURE" as a recent method identifies clusters having non-spherical shapes and wide variances in size. In such a method, each cluster is represented with multiple well-scattered points. The shape of a non-spherical cluster is better represented when more than one point are used. Such a clustering algorithm finishes the clustering process when the number of generated clusters reaches a given value as an input parameter.

However, the conventional clustering methods require multiple input parameters, and do not consider temporal and semantic relationship between data points. Consequently, the conventional clustering methods are problematic in that they cannot be applied to the clustering methods of data sequences such as video clips, in which temporal and semantic relationship between frames are regarded as important.

SUMMARY OF THE INVENTION

Accordingly, the present invention has been made keeping in mind the above problems occurring in the prior art, and an object of the present invention is to provide an apparatus and method, which partitions a data set representable by a multidimensional data sequence, such as a video stream, into segments in consideration of the temporal relationship between points, and groups similar segments in one sequence into the same cluster so as to efficiently search a database for a multidimensional data sequence similar to a given query sequence.

In accordance with one aspect of the present invention, the above object can be accomplished by the provision of an apparatus for hyper-rectangle based multidimensional data segmentation, the multidimensional data being representable by a multidimensional data sequence, comprising threshold calculation means for inputting a multidimensional sequence $S_i$ and the minimum number of points per segment minPts, and calculating bounding threshold values for a volume and an edge using a unit hyper-cube occupied by a single point in n-dimensional unit space, if points are uniformly distributed in a hyper-rectangle which is a minimum bounding rectangle containing all points in the sequence $S_i$; segment generation means for initializing a segment set and an outlier set to empty sets and generating a current segment using a first point of the sequence $S_i$; geometric condition determination means for determining whether a next point of the sequence $S_i$ satisfies a geometric condition using the bounding threshold values for the volume and the edge; segment merging means for merging the next point of the sequence $S_i$ into the current segment if geometric condition is satisfied; and segment updating means for including the current segment in the segment set and re-generating a new current segment using the next point of the sequence $S_i$, if the geometric condition is not satisfied and the number of points contained in the current segment exceeds the minimum number of points per segment minPts.

In accordance with another aspect of the present invention, there is provided an apparatus for hyper-rectangle based multidimensional data segmentation, the multidimensional data being representable by a multidimensional data sequence, comprising threshold calculation means for inputting a multidimensional sequence $S_i$ and the minimum number of points per segment minPts, and calculating bounding threshold values for a volume and a semantic factor using a unit hyper-cube occupied by a single point in n-dimensional unit space, if points are uniformly distributed in a hyper-rectangle which is a minimum bounding rectangle containing all points in the sequence $S_i$; segment generation means for initializing a segment set and an outlier set to empty sets and generating a current segment using a first point of the sequence $S_i$; geometric and semantic condition determination means for determining whether a next point of the sequence $S_i$ satisfies geometric and semantic conditions using the bounding threshold values for the volume and the semantic factor; segment merging means for merging the next point of the sequence $S_i$ into the current segment if the geometric and semantic conditions are satisfied; and segment updating means for including the current segment in the segment set and re-generating a new current segment using the next point of the sequence $S_i$, if the geometric and semantic conditions are not satisfied and the number of points contained in the current segment exceeds the minimum number of points per segment minPts.

In accordance with still another aspect of the present invention, there is provided an apparatus for hyper-rectangle based multidimensional data segmentation, the multidimensional data being representable by a multidimensional data sequence, comprising threshold calculation means for inputting a multidimensional sequence $S_i$ and the minimum number of points per segment minPts, and calculating bounding threshold values for a volume, an edge and a semantic factor using a unit hyper-cube occupied by a single point in n-dimensional unit space, if points are uniformly distributed in a hyper-rectangle which is a minimum bounding rectangle containing all points in the sequence $S_i$; segment generation means for initializing a segment set and an outlier set to empty sets and generating a current segment using a first point of the sequence $S_i$; geometric and semantic condition determination means for determining whether a next point of the sequence $S_i$ satisfies geometric and semantic conditions using the bounding threshold values for the volume, the edge and the semantic factor; segment merging means for merging the next point of the sequence $S_i$ into the current segment if the geometric and semantic conditions are satisfied; and segment updating means for including the current segment in the segment set and re-generating a new current segment using the next point of the sequence $S_i$, if the geometric and semantic conditions are not satisfied and the number of points contained in the current segment exceeds the minimum number of points per segment minPts.

In accordance with still another aspect of the present invention, there is provided an apparatus for hyper-rectangle based multidimensional data clustering, comprising cluster generation means for inputting a segment set for a multidimensional sequence $S_i$, generating clusters each comprised of a single segment from each segment in the segment set, and including the generated clusters in a cluster set; clustering quality determination means for determining whether clustering quality becomes better using spatial placements of hyper-rectangles of two clusters if two arbitrary clusters in the cluster set are selected and the selected two clusters are merged; and cluster updating means for pruning the two clusters from the cluster set and including a merged cluster generated by merging two clusters in the cluster set if it is determined that the clustering quality becomes better according to the clustering quality determined result.

In accordance with still another aspect of the present invention, there is provided an apparatus for hyper-rectangle based multidimensional data clustering, comprising threshold calculation means for inputting a multidimensional sequence $S_i$ and the minimum number of points per segment minPts, and calculating bounding threshold values for a volume and an edge using a unit hyper-cube occupied by a single point in n-dimensional unit space, if points are uniformly distributed in a hyper-rectangle which is a minimum bounding rectangle (MBR) containing all points in the sequence $S_i$; segment generation means for initializing a segment set and an outlier set to empty sets and generating a current segment using a first point of the sequence $S_i$; geometric condition determination means for determining whether a next point of the sequence $S_i$ satisfies a geometric condition using the bounding threshold values for the volume and the edge; segment merging means for merging the next point of the sequence $S_i$ into the current segment if the geometric condition is satisfied; segment updating means for including the current segment in the segment set and re-generating a new current segment using the next point of the sequence $S_i$, if the geometric condition is not satisfied and the number of points contained in the current segment exceeds the minimum number of points per segment minPts; cluster generation means for inputting a segment set updated by the segment updating means, generating clusters each comprised of a single segment from each segment in the segment set, and including the generated clusters in a cluster set; clustering quality determination means for determining whether clustering quality becomes better using spatial placements of hyper-rectangles of two clusters if two arbitrary clusters in the cluster set are selected and the selected two clusters are merged; and cluster updating means for pruning the two clusters from the cluster set and including a merged cluster generated by merging two clusters in the cluster set if it is determined that the clustering quality becomes better according to the clustering quality determined result.

In accordance with still another aspect of the present invention, there is provided an apparatus for hyper-rectangle based multidimensional data clustering, comprising threshold calculation means for inputting a multidimensional sequence $S_i$ and the minimum number of points per segment minPts, and calculating bounding threshold values for a volume and a semantic factor using a unit hyper-cube occupied by a single point in n-dimensional unit space, if points are uniformly distributed in a hyper-rectangle which is a minimum bounding rectangle (MBR) containing all points in the sequence $S_i$; segment generation means for initializing a segment set and an outlier set to empty sets and generating a current segment using a first point of the sequence $S_i$; geometric condition determination means for determining whether a next point of the sequence $S_i$ satisfies geometric and semantic conditions using the bounding threshold values for the volume and the semantic factor; segment merging means for merging the next point of the sequence $S_i$ into the current segment if the geometric and semantic conditions are satisfied; segment updating means for including the current segment in the segment set and re-generating a new current segment using the next point of the sequence $S_i$, if the geometric and semantic conditions are not satisfied and the number of points contained in the current segment exceeds the minimum number of points per segment minPts; cluster generation means for inputting a segment set updated by the segment updating means, generating clusters each comprised of a single segment from each segment in the segment set, and including the generated clusters in a cluster set; clustering quality determination means for determining whether clustering quality becomes better using spatial placements of hyper-rectangles of two clusters if two arbitrary clusters in the cluster set are selected and the selected two clusters are merged; and cluster updating means for pruning the two clusters from the cluster set and including a merged cluster generated by merging two clusters in the cluster set if it is determined that the clustering quality becomes better according to the clustering quality determined result.

In accordance with still another aspect of the present invention, there is provided an apparatus for hyper-rectangle based multidimensional data clustering, comprising threshold calculation means for inputting a multidimensional sequence $S_i$ and the minimum number of points per segment minPts, and calculating bounding threshold values for a volume, an edge and a semantic factor using a unit hyper-cube occupied by a single point in n-dimensional unit space, if points are uniformly distributed in a hyper-rectangle which is a minimum bounding rectangle (MBR) containing all points in the sequence $S_i$; segment generation means for initializing a segment set and an outlier set to empty sets and generating a current segment using a first point of the sequence $S_i$; geometric and semantic condition determination means for determining whether a next point of the sequence $S_i$ satisfies geometric and semantic conditions using the bounding threshold values for the volume, the edge and the semantic factor; segment merging means for merging the next point of the sequence $S_i$ into the current segment if the geometric and semantic conditions are satisfied; segment updating means for including the current segment in the segment set and re-generating a new current segment using the next point of the sequence $S_i$, if the geometric and semantic conditions are not satisfied and the number of points contained in the current segment exceeds the minimum number of points per segment minPts; cluster generation means for inputting a segment set updated by the segment updating means, generating clusters each comprised of a single segment from each segment in the segment set, and including the generated clusters in a cluster set; clustering quality determination means for determining whether clustering quality becomes better using spatial placements of hyper-rectangles of two clusters if two arbitrary clusters in the cluster set are selected and the selected two clusters are merged; and cluster updating means for pruning the two clusters from the cluster set and including a merged cluster generated by merging two clusters in the cluster set if it is determined that the clustering quality becomes better according to the clustering quality determined result.

In accordance with still another aspect of the present invention, there is provided a method for hyper-rectangle based multidimensional data segmentation, the multidimensional data being representable by a multidimensional data sequence, comprising the steps of inputting a multidimensional sequence $S_i$ and the minimum number of points per segment minPts, and calculating bounding threshold values for a volume and an edge using a unit hyper-cube occupied by a single point in n-dimensional unit space, if points are uniformly distributed in a hyper-rectangle which is a minimum bounding rectangle containing all points in the sequence $S_i$; initializing a segment set and an outlier set to empty sets and generating a current segment using a first point of the sequence $S_i$; determining whether a next point of the sequence $S_i$ satisfies a geometric condition using the bounding threshold values for the volume and the edge; merging the next point of the sequence $S_i$ into the current segment if the geometric condition is satisfied; and including the current segment in the segment set and updating the segment set by re-generating a new current segment using the next point of the sequence $S_i$, if the geometric condition is not satisfied and the number of points contained in the current segment exceeds the minimum number of points per segment minPts.

In accordance with still another aspect of the present invention, there is provided a method for hyper-rectangle based multidimensional data segmentation, the multidimensional data being representable by a multidimensional data sequence, comprising the steps of inputting a multidimensional sequence $S_i$ and the minimum number of points per segment minPts and calculating bounding threshold values for a volume and a semantic factor using a unit hyper-cube occupied by a single point in n-dimensional unit space, if points are uniformly distributed in a hyper-rectangle which is a minimum bounding rectangle containing all points in the sequence $S_i$; initializing a segment set and an outlier set to empty sets and generating a current segment using a first point of the sequence $S_i$; determining whether a next point of the sequence $S_i$ satisfies geometric and semantic conditions using the bounding threshold values for the volume and the semantic factor; merging the next point of the sequence $S_i$ into the current segment if the geometric and semantic conditions are satisfied; and including the current segment in the segment set and updating the segment set by re-generating a new current segment using the next point of the sequence $S_i$, if the geometric and semantic conditions are not satisfied and the number of points contained in the current segment exceeds the minimum number of points per segment minPts.

In accordance with still another aspect of the present invention, there is provided a method for hyper-rectangle based multidimensional data segmentation, the multidimensional data being representable by a multidimensional data sequence, comprising the steps of inputting a multidimensional sequence $S_i$ and the minimum number of points per segment minPts, and calculating bounding threshold values for a volume, an edge and a semantic factor using a unit hyper-cube occupied by a single point in n-dimensional unit space, if points are uniformly distributed in a hyper-rectangle which is a minimum bounding rectangle containing all points in the sequence $S_i$; initializing a segment set and an outlier set to empty sets and generating a current segment using a first point of the sequence $S_i$; determining whether a next point of the sequence $S_i$ satisfies geometric and semantic conditions using the bounding threshold values for the volume, the edge and the semantic factor; merging the next point of the sequence $S_i$ into the current segment if the geometric and semantic conditions are satisfied; and including the current segment in the segment set and updating the segment set by re-generating a new current segment using the next point of the sequence $S_i$, if the geometric and semantic conditions are not satisfied and the number of points contained in the current segment exceeds the minimum number of points per segment minPts.

In accordance with still another aspect of the present invention, there is provided a method for hyper-rectangle based multidimensional data clustering, comprising the steps of inputting a segment set for a multidimensional sequence $S_i$, generating clusters each comprised of a single segment from each segment in the segment set and including the generated clusters in a cluster set; determining whether clustering quality becomes better using the spatial placements between hyper-rectangles of two clusters if two arbitrary clusters in the cluster set are selected and the selected two clusters are merged; and pruning the two clusters from the cluster set and updating the cluster set by including a merged cluster generated by merging two clusters in the cluster set if it is determined that the clustering quality becomes better according to the clustering quality determined result.

In accordance with still another aspect of the present invention, there is provided a method for hyper-rectangle based multidimensional data clustering, comprising the steps of inputting a multidimensional sequence $S_i$ and the minimum number of points per segment minPts, and calculating bounding threshold values for a volume and an edge using a unit hyper-cube occupied by a single point in n-dimensional unit space, if points are uniformly distributed in a hyper-rectangle which is a minimum bounding rectangle (MBR) containing all points in the sequence $S_i$; initializing a segment set and an outlier set to empty sets and generating a current segment using a first point of the sequence $S_i$; determining whether a next point of the sequence $S_i$ satisfies a geometric condition using the bounding threshold values for the volume and the edge; merging the next point of the sequence $S_i$ into the current segment if the geometric condition is satisfied; including the current segment in the segment set and updating the segment set by re-generating a new current segment using the next point of the sequence $S_i$, if the geometric condition is not satisfied and the number of points contained in the current segment exceeds the minimum number of points per segment minPts; inputting the updated segment set, generating clusters each comprised of a single segment from each segment in the segment set, and including the generated clusters in a cluster set; determining whether clustering quality becomes better using the spatial placements between hyper-rectangles of two clusters if two arbitrary clusters in the cluster set are selected and the selected two clusters are merged; and pruning the two clusters from the cluster set and updating the cluster set by including a merged cluster generated by merging two clusters in the cluster set if it is determined that the clustering quality becomes better according to the clustering quality determined result.

In accordance with still another aspect of the present invention, there is provided a method for hyper-rectangle based multidimensional data clustering, comprising the steps of inputting a multidimensional sequence $S_i$ and the minimum number of points per segment minPts, and calculating bounding threshold values for a volume and a semantic factor using a unit hyper-cube occupied by a single point in n-dimensional unit space, if points are uniformly distributed in a hyper-rectangle which is a minimum bounding rectangle (MBR) containing all points in the sequence $S_i$; initializing a segment set and an outlier set to empty sets and generating a current segment using a first point of the sequence $S_i$; determining whether a next point of the sequence $S_i$ satisfies geometric and semantic conditions using the bounding threshold values for the volume and the semantic factor; merging the next point of the sequence $S_i$ into the current segment if the geometric and semantic conditions are satisfied; including the current segment in the segment set and updating the segment set by re-generating a new current segment using the next point of the sequence $S_i$, if the geometric and semantic conditions are not satisfied and the number of points contained in the current segment exceeds the minimum number of points per segment minPts; inputting the updated segment set, generating clusters each comprised of a single segment from each segment in the segment set, and including the generated clusters in a cluster set; determining whether clustering quality becomes better using the spatial placements between hyper-rectangles of two clusters if two arbitrary clusters in the cluster set are selected and the selected two clusters are merged; and pruning the two clusters from the cluster set and including a merged cluster generated by merging two clusters in the cluster set if it is determined that the clustering quality becomes better according to the clustering quality determined result.

In accordance with still another aspect of the present invention, there is provided a method for hyper-rectangle based multidimensional data clustering, comprising the steps of inputting a multidimensional sequence $S_i$ and the minimum number of points per segment minPts, and calculating bounding threshold values for a volume, an edge and a semantic factor using a unit hyper-cube occupied by a single point in n-dimensional unit space, if points are uniformly distributed in a hyper-rectangle which is a minimum bounding rectangle (MBR) containing all points in the sequence $S_i$; initializing a segment set and an outlier set to empty sets and generating a current segment using a first point of the sequence $S_i$; determining whether a next point of the sequence $S_i$ satisfies geometric and semantic conditions using the bounding threshold values for the volume, the edge and the semantic factor; merging the next point of the sequence $S_i$ into the current segment if the geometric and semantic conditions are satisfied; including the current segment in the segment set and updating the segment set by re-generating a new current segment using the next point of the sequence $S_i$, if the geometric and semantic conditions are not satisfied and the number of points contained in the current segment exceeds the minimum number of points per segment minPts; inputting the updated segment set, generating clusters each comprised of a single segment from each segment in the segment set, and including the generated clusters in a cluster set; determining whether clustering quality becomes better using the spatial placements between hyper-rectangles of two clusters if two arbitrary clusters in the cluster set are selected and the selected two clusters are merged; and pruning the two clusters from the cluster set and updating the cluster set by including a merged cluster generated by merging two clusters in the cluster set if it is determined that the clustering quality becomes better according to the clustering quality determined result.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a flowchart of a process for obtaining clusters in a data set of MDSs as an algorithm obtained by integrating segmentation and clustering algorithms into one according to a preferred embodiment of the present invention;

DESCRIPTION OF THE PREFERRED EMBODIMENTS

1. Segmentation of Sequence

Figure 1:
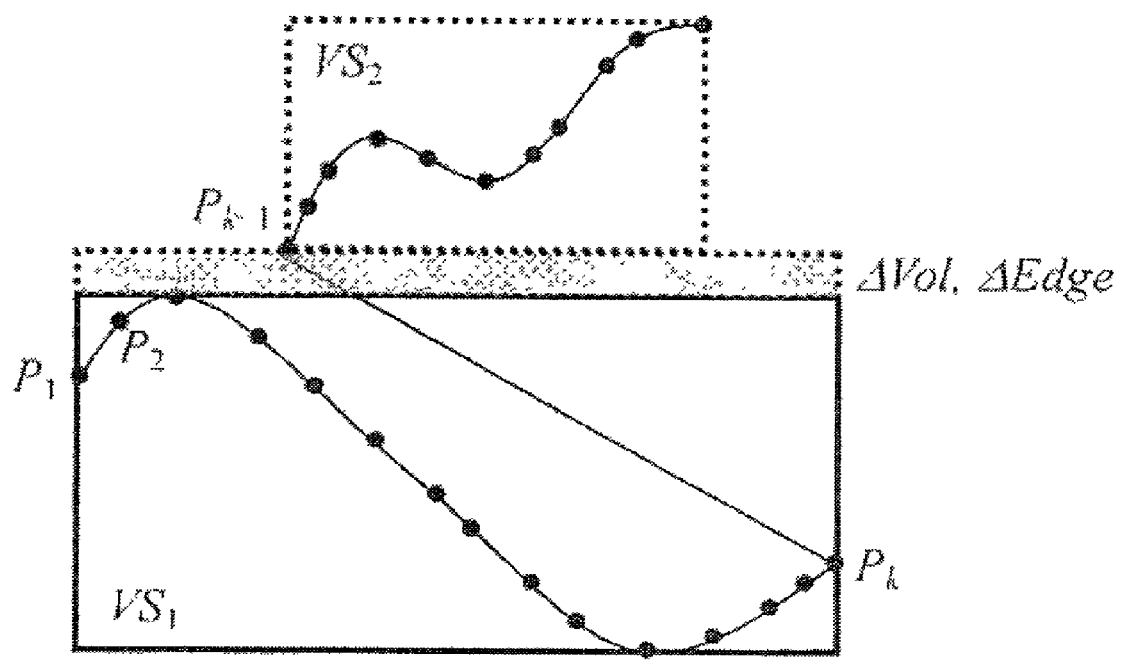
FIG. 1 is a graph showing a semantic factor among clustering factors of this invention.

Video information processing is one of areas difficult to handle in spite of its utility, because it requires huge amounts of storage space and processing power. In order to overcome this difficulty, it is essential that the video data should be effectively represented, stored, and retrieved. A video database contains a large number of video clips that can be represented by multidimensional data sequences (MDSs).

The video clip consists of multiple frames in temporal order, and each frame can be represented by a multidimensional vector in the feature space such as RGB or YcbCr color space. Accordingly, the video clip can be modeled as a sequence of points in a multidimensional space such that each frame of the sequence constitutes a multidimensional point. Accordingly, the problem of clustering frames in a video clip can be transformed into that of clustering points of an MDS in a multidimensional space by modeling the video clip to an MDS, as described above. Each MDS is partitioned into segments, and then similar segments are grouped into a cluster.

In order to effectively support the representation and the retrieval of MDS's, clustering techniques must satisfy various requirements. Those requirements are categorized into two classes as follows: the geometric characteristics of clusters, and the temporal and semantic relationship between elements in a cluster.

First, the cluster should be dense with respect to the volume and the edge of a cluster for the efficient retrieval. This can be realized by minimizing the volume and the length of edge of a cluster per point, and maximizing the number of points per cluster.

Next, the temporal and semantic relation between elements in the cluster must be maintained even if the clustering is completed. That is, information on temporal ordering of elements in the cluster must be preserved, and elements in a cluster must be semantically similar.

Besides these requirements, the clustering technique must deal with outliers appropriately and minimize the number of input parameters to the clustering algorithm. In consideration of these requirements, the clustering problem proposed in the present invention can be formalized as follows.

Given: A data set of MDS's and the minimum number of points minPts per segment

Goal: To find the sets of clusters and outliers that optimize the values of predefined measurement criteria.

Here, the input parameter minPts is needed to determine the outliers. If a segment has points less than a given minPts after the segmentation process, all points in the segment are regarded as the outliers.

In the sequence segmentation method proposed in the present invention, the MDS is partitioned into segments such that predefined geometric and semantic criteria are satisfied. Outliers are also identified in this process. Next, in the clustering method, similar segments in one MDS are grouped into a cluster so as to get the better clustering quality. Through these methods, the given sequence is represented by a small number of clusters which are indexed and stored in a database for later processing.

An important property of the method proposed in the present invention is that most parameter values required for clustering are determined using the characteristics of the sequence, not supplied as external variables by the user. This property provides advantages in the following two aspects.

First, a method proposed in the present invention requires only one input parameter, that is, the minimum number of points per segment minPts. Generally, because it is not easy to get the domain knowledge in advance so as to set clustering parameters, such as the number of clusters to be generated or the minimum distance between clusters, it is desirable to minimize the number of input parameters.

Second, the method proposed in the present invention generates clusters considering the properties of a sequence, such as the type of video. For example, the scenes of a news video are not frequently changed while those of a cartoon or an animation film are frequently changed. The object of generating the clusters having such a difference can be achieved by setting parameters required for the clustering process different.

After the multidimensional sequence is generated, each sequence is partitioned into subsequences, and each subsequence is contained in the hyper-rectangle(HR). Sequence segmentation is a process for generating HRs by continuously merging a point of the sequence into an HR if the predefined criteria are satisfied. Consider a case that a point P is merged into a HR hr in the unit space $[0, 1]^n$.

The segmentation proceeds such that if the merging of the point P into the HR hr satisfies the predefined conditions, the point P is merged into the hr of a current subsequence, otherwise, a new subsequence is started from the point P. Further, the algorithm proposed in the present invention detects outliers, wherein the outliers cause a distorted partition when the sequence is partitioned into HRs from noise in the sequence. In other words, the volume or the edge of the HR is undesirably increased due to the outliers, which decreases the efficiency of retrieval.

Therefore, there is a need to exclude such outliers from the partition process. The HR is defined as the following Definition 1 in consideration of k points contained in the HR.

[Definition 1]

A HR containing k points $P_j (j=1, 2, \ldots, k)$ in the temporal order in the n-dimensional space is defined as the following Equation [1].

$$HR = \langle L, H, k \rangle \quad [1]$$

$$L = \left\{ (L^1, L^2, \ldots, L^n) \mid L^i = \min_{1 \leq j \leq k} P_j^i \right\}$$

$$H = \left\{ (H^1, H^2, \ldots, H^n) \mid H^i = \max_{1 \leq j \leq k} P_j^i \right\}$$

$$i = 1, 2, \ldots, n$$

Further, the points $P_j$ can be represented in the hyper-rectangular form for convenience by placing $L^i = H^i = P_j^i$ for all dimensions. That is, the HR is represented as $<P_i, P_j, 1>$. Such a rectangle is denoted by HR($P_j$) which has zero volume and edge. On the other hand, the volume Vol (HR) and the total edge length Edge (HR) of the hyper-rectangle HR are defined as the following Equation [2].

$$Vol(HR) = \prod_{1 \leq i \leq n} (HR \cdot H^i - HR \cdot L^i) \quad [2]$$

$$Edge(HR) = 2^{n-1} \sum_{1 \leq i \leq n} (HR \cdot H^i - HR \cdot L^i)$$

Meanwhile, the following three parameters are used as quantitative measures used to evaluate the quality of clustering.

VPP: Volume of clusters Per Point
EPP: Edge of clusters Per Point
PPC: Number of Points per Cluster The above three parameters are defined as the following Equation [3].

$$VPP = \frac{\sum_{1 \leq j \leq p} Vol(HR_j)}{\sum_{1 \leq j \leq p} HR_j \cdot k} \quad [3]$$

$$EPP = \frac{\sum_{1 \leq j \leq p} Edge(HR_j)}{\sum_{1 \leq j \leq p} HR_j \cdot k}$$

$$PPC = \frac{\sum_{1 \leq j \leq p} HR_j \cdot k}{p}$$

Accordingly, the volume of clusters per point VPP (HR) and the edge of clusters per point EPP (HR) of the hyper-rectangle HR are calculated as the following Equation [4].

$$VPP(HR) = \frac{vol(HR)}{HR \cdot k} = \frac{\prod_{1 \leq i \leq n} (HR \cdot H^i - HR \cdot L^i)}{HR \cdot k} \quad [4]$$

$$EPP(HR) = \frac{Edge(HR)}{HR \cdot k} = \frac{2^{n-1} \sum_{1 \leq i \leq n} (HR \cdot H^i - HR \cdot L^i)}{HR \cdot k}$$

Two hyper-rectangles can be merged during sequence segmentation and clustering processes. In order to perform this merging operation, a merging operator is defined as the following Definition 2.

[Definition 2]

The merging operator $\oplus$ between two hyper-rectangles is defined by Equation [5] below.

$$HR_1 \oplus HR_2 = HR_3$$

$$HR_3.L = \{(HR_3.L^1, HR_3.L^2, \ldots, HR_3.L^n) \mid HR_3.L^i = \min(HR_1.L^i, HR_2.L^i)\}$$

$$HR_3.H = \{(HR_3.H^1, HR_3.H^2, \ldots, HR_3.H^n) \mid HR_3.H^i = \min(HR_1.H^i, HR_2.H^i)\} \; i=1,2,\ldots,n$$

$$HR_3.k = HR_1.k + HR_2.k \quad [5]$$

According to the Definition 8, it can be recognized that the merging operator ⊕ has a symmetric property. That is, $HR_1 \oplus HR_2 = HR_2 \oplus HR_1$ is constructed. Consider a case that the point P is merged to the hyper-rectangle HR=<L, H, k>. This merging process will probably cause changes in the volume, the edge and the number of points of the hyper-rectangle. The amount of change in each is an important factor for clustering, and volume and edge increments can be expressed as the following Equation [6].

$$\Delta\text{Vol}(HR,P) = \text{Vol}(HR \oplus HR(P)) - \text{Vol}(HR)$$

$$\Delta\text{Edge}(HR,P) = \text{Edge}(HR \oplus HR(P)) - \text{Edge}(HR) \quad [6]$$

In the present invention, two clustering factors to be considered for clustering MDSs are discussed, wherein the two clustering factors are geometric and semantic factors. The former is related to the geometric characteristics of hyper-cubes and applied to both the segmentation and the clustering. The latter is related to the semantic relationship between points in the hyper-cubes and applied only to the segmentation.

The geometric characteristics of the cluster significantly affect the search efficiency, such that the geometric characteristics must be considered importantly for clustering. It is obvious that a cluster with a large volume in the search space has the higher possibility to be accessed by a query than that of a small volume. However, the edge of the cluster must be also considered as an important factor in addition to the volume of the cluster.

Further, two consecutive points in a segment are closely related to each other semantically, such that the distance therebetween must be also considered as an important factor. If an arbitrary point is spatially far from the previous point in a sequence, it can be assumed that a new segment is started from the arbitrary point.

FIG. 1 is a graph showing the semantic factor of the clustering factors of this invention, and the semantic factor is described as follows.

Referring to FIG. 1, consider a problem for determining whether in an MDS composed of a series of points $P_j$ for j=1, 2, ..., k, k+1, ..., a point $P_{k+1}$ is to be merged into a segment $VS_1$ or a new segment is stared from the point $P_{k+1}$. Assuming that in case the point $P_{k+1}$ is included in the segment $VS_1$, the increments of the volume and edge are respectively $\Delta\text{Vol}(VS_1, P_{k+1})$ and $\Delta\text{Edge}(VS_1, P_{k+1})$, these amounts are related to the shaded area in FIG. 1. If the volume and the edge are just considered as the clustering factors, it is highly possible that the point $P_{k+1}$ is included in the segment $VS_1$, because both $\Delta\text{Vol}$ and $\Delta\text{Edge}$ are relatively small.

However, because the point $P_{k+1}$ is spatially far from the previous point $P_k$, that is, two points are dissimilar semantically, it is preferable that a new segment $VS_2$ is started from the point $P_{k+1}$. This means that the distance between two consecutive points must be also considered as an important clustering factor.

The segmentation is the process for generating each segment by continuously merging a point of the sequence into a current hyper-rectangle if the predefined criteria are satisfied. Assume that a point P is merged into the hyper-rectangle HR=<L, H, k> in the unit space $[0, 1]^n$. The segmentation is done in such a way such that if the merging of the point P into the hyper-rectangle HR satisfies certain given conditions, the point P is merged into the HR of the current segment, otherwise, a new segment is started from the point P. In the segmentation process, a merging object is a hyper-rectangle, while a merged object is always a point.

The segment is defined as the following Definition 3.

[Definition 3]

A segment VS containing k points in the temporal order, $P_j$ for j=1, 2, ..., k, is defined as the following Equation [7].

$$VS = <sid, SP, HR> \quad [7]$$

Here, sid is the segment identification (id), and SP is the starting point of the segment VS.

In order to merge an arbitrary point into a specific segment during the segmentation process, predefined geometric and semantic criteria must be satisfied. Hereinafter, such criteria and proposed algorithms are described in detail.

1-1 Geometric Criterion

The geometric criterion is the geometric bounding condition with respect to the volume and edge of the segment. For the geometric bounding condition, the concept of a unit hyper-cube is first introduced.

Provided that a minimum hyper-rectangle containing all K points in the sequence S is $HR_s$, a unit hyper-cube uCube is defined as a cube occupied by a single point in the space $[0, 1]^n$ if all points in the sequence S are uniformly distributed over the minimum hyper-rectangle $HR_s$. If the side-length of the cube is e, the volume and the edge are expressed as the following Equation [8].

$$Vol(nCUBE) = e^n = \frac{Vol(HR_s)}{K} \quad [8]$$

$$Edge(uCUBE) = 2^{n-1} n \; e = 2^{n-1} n \sqrt[n]{\frac{Vol(HR_s)}{K}}$$

If all points of the sequence S are uniformly scattered into the space of $HR_s$, it can be recognized that one point is allocated to a unit hyper-cube uCube. In other words, it is intuitively seen that each point of S forms a hyper-rectangle having a unit hyper-cube shape. However, the uniform distribution assumed here is not likely to occur in reality. Frames in a video shot are very similar, and if each frame is represented by one point, these points are clustered together. The uniform distribution provides a geometric condition for determining whether or not the merging of two clusters is allowed.

In other words, the bounding thresholds with respect to the volume and the edge are given as the following Equation [9].

$$\tau_{vol} = Vol(uCUBE) = e^n$$

$$\tau_{edge} = Edge(uCUBE) = 2^{n-1} n \; e \quad [9]$$

A geometric bounding condition proposed in the present invention on the basis of the above descriptions is represented as the following Definition 4.

[Definition 4]

If the point P is merged into the segment VS in the space $[0, 1]^n$, the geometric bounding condition is the condition to be satisfied so as to merge the point P into the segment VS and defined as the following Equation [10].

$$\Delta Vol(VS,P) \leq \tau_{vol}, \Delta Edge(VS,P) \leq \tau_{edge} \quad [10]$$

Meanwhile, the clustering that satisfies the geometric bounding condition guarantees better clustering quality than the case of the uniform distribution, with respect to VPP and EPP. The better clustering quality can be proven with a simple mathematical operation, however the operation is omitted for simplification of description.

1-2 Semantic Criterion

In order to determine whether or not a specific point is to be merged into a current segment, the distance between the specific point and its previous point in the sequence is examined. If the distance exceeds a predefined threshold, a new segment is started from the specific point. Consider an MDS having K points $P_j$ for j=1,2, . . . , K. A threshold $\tau_{dist}$ is the mean distance between all pairs of adjacent points in the sequence, and defined as the following Equation [11].

$$\tau_{dist} = \frac{1}{K-1} \sum_{1 \leq j \leq +K-1} dist(P_j, P_{j+1}) \quad [11]$$

A semantic bounding condition based on the above descriptions is represented as the following Definition 5.

[Definition 5]

If a point $P_{k+1}$ is merged into a segment VS in the unit space $[0, 1]^n$, the semantic condition is the condition to be satisfied for merging the point $P_{k+1}$ into the segment VS and defined as the following Equation [12].

$$dist(P_k, P_{k+1}) \leq \tau dist \quad [12]$$

If the condition is satisfied, the distance between any pair of two consecutive points in the segment is equal to or less than the mean distance between all pairs of consecutive points in the sequence. This means that consecutive points in a segment must have considerable similarity.

1-3 Sequence Segmentation Algorithm

The merging of any point into a segment is allowed only if the geometric and semantic bounding conditions are satisfied. Further, the input parameter minPts is used to decide outliers. If the number of points in the segment after the segmentation process is less than the parameter minPts, all points in the segment are considered as the outliers.

Figure 2:
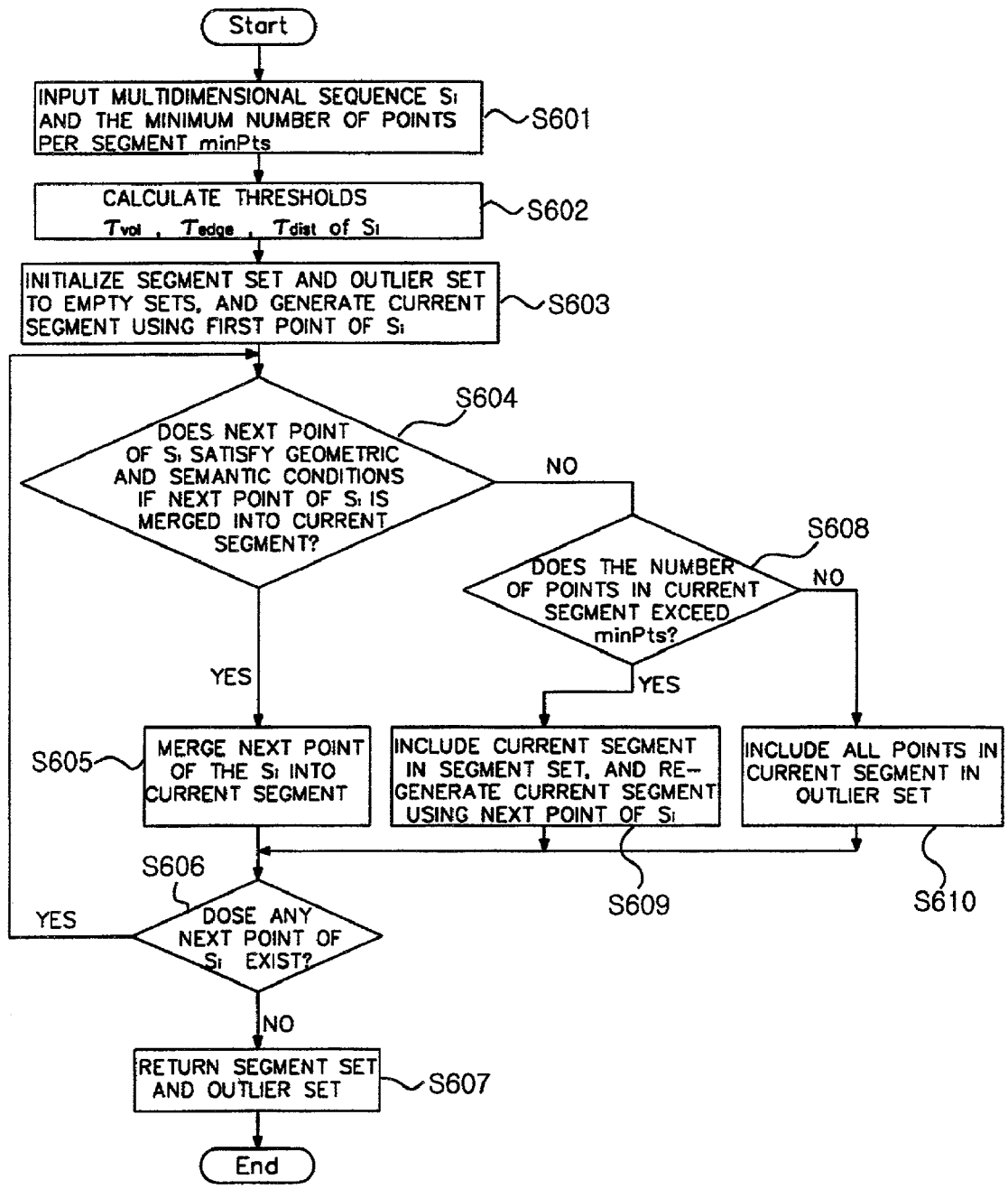
FIG. 2 is a flowchart of a sequence segmentation process according to a preferred embodiment of the present invention.

FIG. 2 is a flowchart of a sequence segmentation process according to a preferred embodiment of the present invention, and the sequence segmentation process is described in detail based on the above descriptions as follows.

First, a multidimensional sequence $S_i$ and the minimum number of points per segment minPts are inputted at step S601, and thresholds $\tau_{vol}$, $\tau_{edge}$, $\tau_{dist}$ for $S_i$ are calculated at step S602. Then, a set of segments and a set of outliers are initialized to empty sets, and a current segment is generated using a first point of $S_i$ at step S603. This generation algorithm has been described above in detail.

Then, if a next point of $S_i$ is merged into the current segment, it is determined whether the next point satisfies both the geometric and semantic bounding conditions at step S604.

If it is determined that both the conditions are satisfied according to the determined result at step S604, the next point of the $S_i$ is merged into the current segment at step S605, and then it is determined whether or not any next point of $S_i$ exists at step S606.

If it is determined that any next point exists at step S606, the process returns to the step S604. On the other hand, if there is not any next point, the segment set and the outlier set are returned and then the process ends at step S607.

On the other hand, if the next point does not satisfy any one of the geometric and semantic bounding conditions according to the determined result at step S604, it is evaluated whether the number of points in the current segment exceeds the parameter minPts or not at step S608.

If the number of points in the current segment exceeds the minPts, the current segment is included in the segment set, and a new current segment is re-generated using the next point of the $S_i$ at step S609. After the step S609 is performed, the step S606 is performed.

Further, if the number of points in the current segment does not exceed the minPts at step S608, all points in the current segment are included in the outlier set at step S610, and then the step S606 is performed.

2. Sequence Clustering

After the segments are generated from an MDS, spatially close segments need to be merged together so as to improve the clustering quality according to the above description. It is important to determine whether or not two hyper-rectangles for representing the segments or clusters are to be merged. This merging of two hyper-rectangles is allowed only if the predefined condition is satisfied. As the merging is progressed, the clusters are gradually larger, and then the given measurement criteria are optimized. The cluster is defined as the following Definition 6.

[Definition 6]

A cluster VC having r segments $VS_j$ for j=1,2, . . . , r in the temporal order is defined as the following Equation [13].

$$VC = <cid, slist, HR> \quad HR = <L, H, k> \quad [13]$$

$$L = \{L^1, L^2, \ldots, L^n\} \mid L^i = \min_{1 \leq j \leq r}(VS_j \cdot HR \cdot L^i)\}$$

$$H = \{(H^1, H^2, \ldots, H^n) \mid H^i = \min_{1 \leq j \leq r}(VS_j \cdot HR \cdot H^i)\}$$

$$k = \sum_{1 \leq j \leq r}(VS_j \cdot HR \cdot k)$$

$$i = 1, 2, \ldots, n$$

It is important to understand the spatial placement of two hyper-rectangles so as to determine whether two hyper-rectangles are to be merged.

2-1 Placement of Two Hyper-rectangles

There are three types of placements based on their relative positions: inclusion, intersection and disjunction. The analysis on each placement with its possibility of merging will be described.

Figure 3:
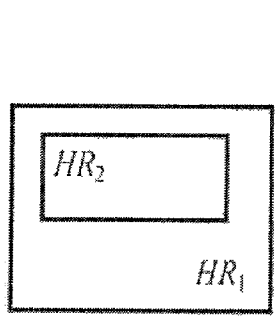
FIG. 3 is a graph showing the spatial placements between hyper-rectangles.
Figure 3:
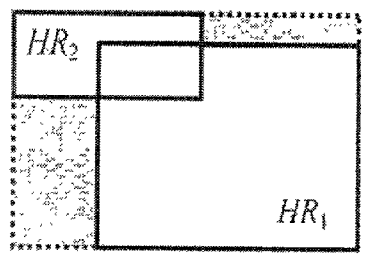
Figure 3:

FIG. 3 is a graph showing the placement of two hyper-rectangles, and the placement is described in detail as follows.

Assume that two hyper-rectangles $HR_1$ and $HR_2$ are merged to generate a merged hyper-rectangle $HR_m$ (in other words, $HR_m = HR_1 \oplus HR_2$). Further, provided that $VPP_m$ and $EPP_m$ are respectively VPP and EPP of the merged hyper-rectangle, and $VPP_n$ and $EPP_n$ are respectively VPP and EPP for the case of non-merging, the following Equation [14] is constructed.

$$VPP_m = \frac{Vol(HR_M)}{HR_m \cdot k} = \frac{Vol(HR_1 \oplus HR_2)}{HR_m \cdot k} \quad [14]$$

$$EPP_m = \frac{Edge(HR_m)}{HR_m \cdot k} = \frac{Edge(HR_1 \oplus HR_2)}{HR_m \cdot k}$$

$$VPP_n = \frac{Vol(HR_1) + Vol(HR_2)}{HR_1 \cdot k + HR_2 \cdot k}$$

$$EPP_n = \frac{Edge(HR_1) + Edge(HR_2)}{HR_1 \cdot k + HR_2 \cdot k}$$

2-1-1 Inclusion ($HR_1 \supseteq HR_2$)

This case is shown in FIG. 3a, in which $Vol(HR_m)=Vol(HR_1)$. Therefore, the following Equation [15] is derived from Equation [14].

$$VPP_n = \frac{Vol(HR_1) + Vol(HR_2)}{HR_1 \cdot k + HR_2 \cdot k} =$$

$$\frac{Vol(HR_m) + Vol(HR_2)}{HR_m \cdot k} = VPP_m + \frac{Vol(HR_2)}{HR_m \cdot k}$$

$$\text{So, } VPP_m = VPP_n - \frac{Vol(HR_2)}{HR_m \cdot k}$$

Because $HR_1 \supseteq HR_2$, $$0 \leq \frac{Vol(HR_2)}{HR_m \cdot k} \leq \frac{Vol(HR_1)}{HR_m \cdot k} = \frac{Vol(HR_1)}{HR_m \cdot k} = VPP_m.$$

Therefore, $\frac{1}{2} VPP_n \leq VPP_m \leq VPP_n$.

Similarly, because $Edge(HR_m) = Edge(HR_1)$, $$EPP_n = \frac{Edge(HR_1) + Edge(HR_2)}{HR_1 \cdot k + HR_2 \cdot k} = \frac{Edge(HR_m) + Edge(HR_2)}{HR_m \cdot k} =$$

$$VPP_m + \frac{Edge(HR_2)}{HR_m \cdot k} \text{ can be induced.}$$

Therefore, $EPP_m = EPP_n - \frac{Edge(HR_2)}{HR_m \cdot k}, 0 \leq \frac{Edge(HR_2)}{HR_m \cdot k} \leq EPP_m,$ $$\frac{1}{2} EPP_n \leq EPP_m \leq EPP_n \text{ is constructed.} \quad [15]$$

According to Equation [15], $VPP_m \leq VPP_n$ and $EPP_m \leq EPP_n$ are constructed, such that VPP and EPP generated after the merging are always better than those in non-merging. Therefore, when a hyper-rectangle is included in the other one, the two hyper-rectangles must be certainly merged.

2-1-2 Intersection ($HR_1 \cap HR_2 \neq \emptyset$)

This case is shown in FIG. 3b, and in order to get better clustering quality with respect to VPP and EPP than the case of non-merging, the relations of $VPP_m \leq VPP_n$ and $EPP_m \leq EPP_n$ must be constructed. The following Equation [16] is constructed using the Equation [14].

$$VPP_m = \qquad [16]$$

$$\frac{Vol(HR_M)}{HR_m \cdot k} = \frac{Vol(HR_1 \oplus HR_2)}{HR_m \cdot k} \leq \frac{Vol(HR_1) + Vol(HR_2)}{HR_1 \cdot k + HR_2 \cdot k} = VPP_n$$

$$EPP_m = \frac{Edge(HR_m)}{HR_m \cdot k} =$$

$$\frac{Edge(HR_1 \oplus HR_2)}{HR_m \cdot k} \leq \frac{Edge(HR_1) + Edge(HR_2)}{HR_1 \cdot k + HR_2 \cdot k} = EPP_n$$

Conditions required for getting the better clustering quality by Equation [16] are represented by the following Equation [17].

$$Vol(HR_1 \oplus HR_2) \leq Vol(HR_1) + Vol(HR_2)$$

$$Edge(HR_1 \oplus HR_2) \leq Edge(HR_1) + Edge(HR_2) \quad [17]$$

When two hyper-rectangles intersect, the edges of the two rectangles intersect in every dimension. Therefore, the following Lemma 1 is formed according to geometric characteristics of a hyper-rectangle.

[Lemma 1]

When two hyper-rectangles $HR_1$ and $HR_2$ intersect, the following Equation [18] is constructed with respect to the edge.

$$Edge(HR_1 \oplus HR_2) \leq Edge(HR_1) + Edge(HR_2) \quad [18]$$

Prove that the Equation [18] is constructed. Assuming that $e_i(HR)$ is the edge length of HR in dimension i, if two hyper-rectangles $HR_1$ and $HR_2$ intersect, the edges of two hyper-rectangles $HR_1$ and $HR_2$ intersect in every dimension. Accordingly, $e_i(HR_1 \oplus HR_2) \leq e_i(HR_1) + e_i(HR_2)$ is constructed. Considering all dimensions, the edge is defined as the following Equation [19], such that the construction of Equation [18] is proven.

$$Edge(HR_1 \oplus HR_2) = \sum_{1 \leq i \leq n} e_i(HR_1 \oplus HR_2) \leq \quad [19]$$

$$\sum_{1 \leq i \leq n} (e_i(HR_1) + e_i(HR_2))$$

$$= \sum_{1 \leq i \leq n} e_i(HR_1) + \sum_{1 \leq i \leq 1n} e_i(HR_2)$$

$$= Edge(HR_1) + Edge(HR_2)$$

Conditions required for getting better clustering quality by the Lemma 1 are consequently simplified as the following Equation [20].

$$Vol(HR_1 \oplus HR_2) \leq Vol(HR_1) + Vol(HR_2) \quad [20]$$

2-1-3 Disjunction ($HR_1 \cap HR_2 = \emptyset$)

This case is shown in FIG. 3c, and if two hyper-rectangles are disjoint, the value of $Vol(HR_1 \oplus HR_2)$ is always greater than that of $Vol(HR_1)+Vol(HR_2)$. On the other hand, the values of Edge $(HR_1 \oplus HR_2)$ and Edge $(HR_1)+$Edge $(HR_2)$ are varied according to conditions. In this case, the following Equation [21] is derived depending on the above Equation [14].

$$VPP_M = \frac{Vol(HR_M)}{HR_M \cdot k} = \frac{Vol(HR_1 \oplus HR_2)}{HR_m \cdot k} \bigg\} \quad [21]$$

$$\frac{Vol(HR_1) + Vol(HR_2)}{HR_1 \cdot k + HR_2 \cdot k} = VPP_n$$

In this case, both VPP and EPP are considered as the clustering quality. So, assuming that two hyper-rectangles are disjoint, if two hyper-rectangles are merged regardless of EPP, the clustering quality becomes worse. Consequently, in such a case, the merging is not allowed.

Considering the above three cases, the following final Lemma 2 is constructed.

[Lemma 2]

When two hyper-rectangles $HR_1$ and $HR_2$ of segments or clusters are merged, if the following Equation [22] is constructed, the merged case always guarantees better clustering quality with respect to VPP, EPP and PPC than the case of non-merging.

$$Vol(HR_1 \oplus HR_2) \leq Vol(HR_1) + Vol(HR_2) \quad [22]$$

Meanwhile, if Lemma 2 is constructed, the following Equation [23] is also constructed.

$$VPP_M = \frac{\text{Vol}(HR_1 \oplus HR_2)}{HR_1 \cdot k + HR_2 \cdot k} \leq \frac{\text{Vol}(HR_1) + \text{Vol}(HR_2)}{HR_1 k + HR_2 \cdot k} = VPP_n \quad [23]$$

Further, if two hyper-rectangles $HR_1$ and $HR_2$ intersect, $\text{Vol}(HR_1 \oplus HR_2) \leq \text{Vol}(HR_1) + \text{Vol}(HR_2)$ is constructed. Therefore, it can be seen that $\text{Edge}(HR_1 \oplus HR_2) \leq \text{Edge}(HR_1) + \text{Edge}(HR_2)$ is always constructed from the Lemma 1. Consequently, the following Equation [24] is derived.

$$EPP_M = \frac{\text{Edge}(HR_1 \oplus HR_2)}{HR_1 \cdot k + HR_2 \cdot k} \leq \frac{\text{Edge}(HR_1) + \text{Edge}(HR_2)}{HR_1 k + HR_2 \cdot k} = EPP_n \quad [24]$$

Assuming that $PPC_m$ is PPC of a merged hyper-rectangle and $PPC_n$ is PPC for the case of non-merging, the following Equation [25] is constructed by the Equation [3].

$$PPC_n = \frac{HR_1 \cdot k + HR_2 \cdot k}{2} \quad [25]$$
$$PPC_M = HR_1 \cdot k + HR_2 k$$

Therefore, because $PPC_m > PPC_n$ is constructed, the above Lemma 2 is formed.

The Lemma 2 states that when two hyper-rectangles are merged, the expanded volume ExpVol by merging must be equal to or less than the volume of the intersected space of two rectangles. The volume ExpVol is represented as the shaded space in FIG. 3b. In other words, the following Equation [26] is constructed.

$$\text{Vol}(HR_1 \oplus HR_2) = \text{Vol}(HR_1 \cup HR_2) + \text{ExpVol} = \text{Vol}(HR_1) + \text{Vol}(HR_2) - \text{Vol}(HR_1 \cap HR_2) + \text{ExpVol}$$

$$\text{Vol}(HR_1 \oplus HR_2) - \text{Vol}(HR_1) + \text{Vol}(HR_2)) = -\text{Vol}(HR_1 \cap HR_2) + \text{ExpVol} \quad [26]$$

According to the Lemma 2, $-\text{Vol}(HR_1 \cap HR_2) + \text{ExpVol} \leq 0$ is constructed, and consequently, $\text{ExpVol} \leq \text{Vol}(HR_1 \cap HR_2)$ is constructed.

2-2 Sequence Clustering Algorithm

The merging of two hyper-rectangles is allowed only if the condition of Lemma 2 is satisfied.

Figure 4:
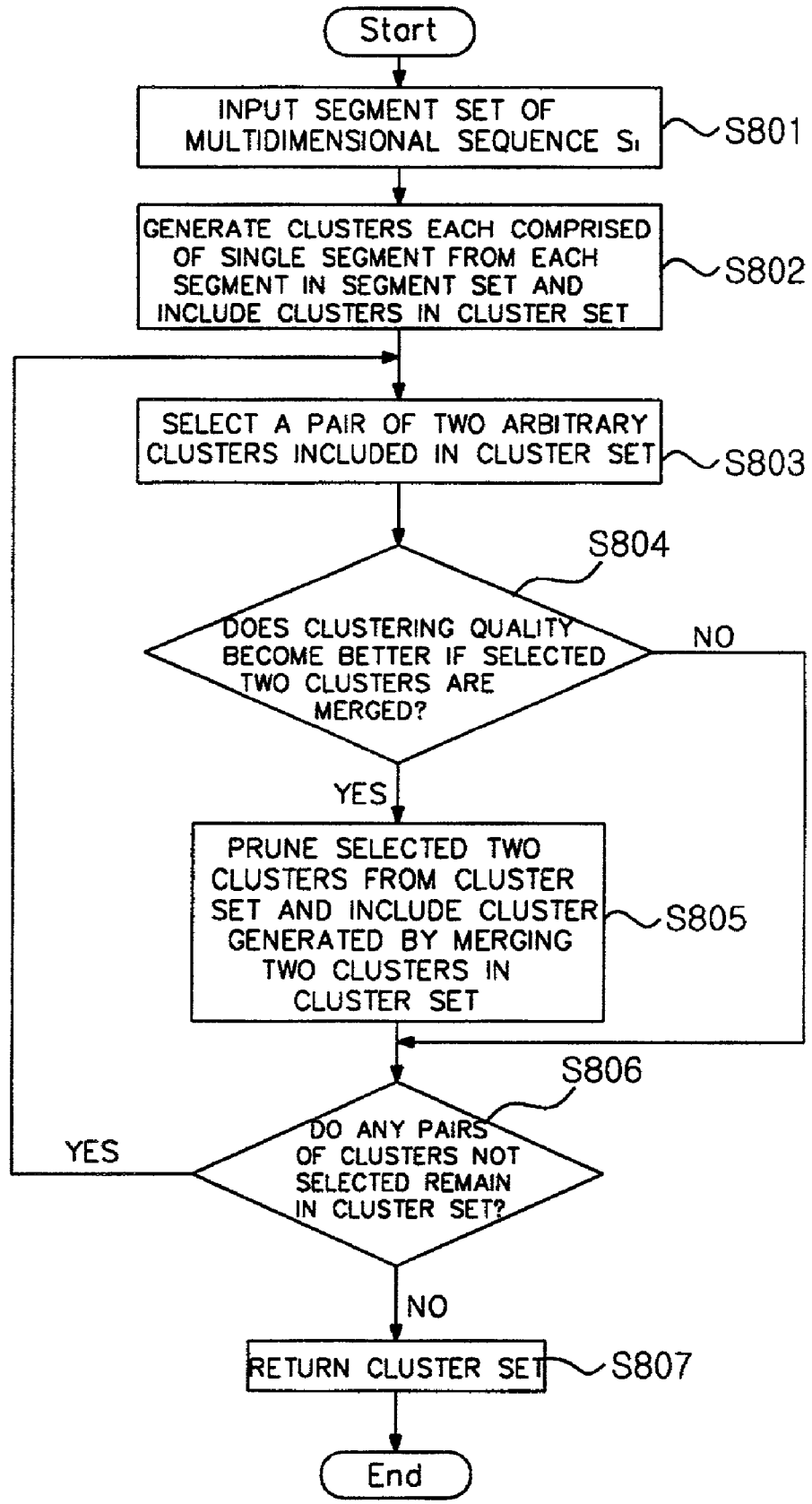
FIG. 4 is a flowchart of a sequence clustering process according to a preferred embodiment of the present invention.

FIG. 4 is a flowchart of a sequence clustering process according to a preferred embodiment of the present invention, and the sequence clustering process is described in detail as follows.

First, a set of segments of a multidimensional sequence $S_i$ is inputted at step S801. Then, clusters each comprised of a single segment are generated from each segment in the segment set, and the generated clusters are included in a set of clusters at step S802. Then, a pair of two arbitrary clusters included in the cluster set are selected at step S803. Then, if the selected two clusters are merged, it is determined whether the clustering quality becomes better at step S804. At this time, the determination on the better clustering quality is performed according to the above descriptions.

If it is determined that the clustering quality becomes better at step S804, the selected two clusters are pruned from the cluster set and a cluster generated by merging the two clusters is included in the cluster set at step S805.

Then, it is determined whether any pair of clusters not selected remains in the cluster set at step S806. At this time, if any pair of clusters remains in the cluster set, the step S803 is performed, otherwise, the cluster set is returned and the process ends at step S807.

On the other hand, if it is determined that the clustering quality does not become better at step S804, the step S806 is performed.

3. Overall Algorithm of Sequence Segmentation and Clustering

FIG. 5 simply shows a process for getting a cluster in a data set of MDSs using an overall algorithm in which the segmentation algorithm described in chapter 1 and the clustering algorithm described in chapter 2 are consolidated.

The overall algorithm is named "VDCluster" for convenience, wherein inputs are the data set of MDSs and the parameter minPts and outputs are a set of clusters and a set of outliers.

First, step 0 is the step for initializing various kinds of variables, and concretely, the cluster set and the outlier set are initialized to empty sets.

Step 1 includes procedures for performing the sequence segmentation and the sequence clustering with respect to all MDSs in the data set, in which each procedure is accomplished according to the above descriptions.

Step 2 is the procedure for getting results after the entire process is completed, and then returning the cluster set and the outlier set.

Such an overall algorithm takes the data set and the parameter minPts used to determine outliers as two input parameters, and outputs the outlier set and the cluster set. Even if this algorithm returns the cluster set excluding segments, the information on the segments is not lost because each cluster holds a list of segments.

The complexity of the algorithm VDCluster is clearly the number O(N) of the elements in the outlier set with respect to the number N of the sequences in the database. That is, considering the sequence segmentation algorithm, the computation of O(K) is required for getting threshold values with respect to K points in each sequence at step 0, and further the computation of O(K) is required for performing the repeating loop as "for-loop" at step 1. There is no need to consider the number of the segments or clusters, because the number of the segments or clusters is negligible small compared to K and is variable.

Consequently, because the complexity of the overall algorithm is linear with respect to N and K, it is O(NK).

4. Experiments

In order to evaluate the effectiveness of the methods proposed in the present invention, the experiments were performed using a variety of real-world videos such as TV news, dramas and animation films.

4-1 Effectiveness Experiments for Sequence Segmentation and Clustering 4-1-1 Experimental Environments Video clips having different lengths were generated from various video data source so as to use the video clips as experimental data, and RGB color features were extracted from frames in each clip. The RGB color features are represented by multidimensional vectors, and one frame is mapped into one point in a multidimensional space, such that one video clip is represented by an MDS.

In the experiments, three-dimensional data were used for convenience, however, the methods proposed in the present invention are not limited to the dimensionality of data. The data used in the experiments of this invention consist of video clips having different lengths of 30 to 9000 frames (that is, video clips of one second to five minutes length), each video clip being represented by a three-dimensional sequence. In the experiments of the present invention, total 6,984 video clips were used. The following Table 1 summarizes data used in the experiments.

TABLE 1

Data used in experiments

| Data name | Length of video clip (the number of frames) | The number of video clips |
| --- | --- | --- |
| V1 | 30 < L ≦ 500 | 1,527 |
| V2 | 500 < L ≦ 1000 | 1,216 |
| V3 | 1000 < L ≦ 2000 | 1,032 |
| V4 | 2000 < L ≦ 3000 | 836 |
| V5 | 3000 < L ≦ 4000 | 645 |
| V6 | 4000 < L ≦ 5000 | 508 |
| V7 | 5000 < L ≦ 6000 | 415 |
| V8 | 6000 < L ≦ 7000 | 336 |
| V9 | 7000 < L ≦ 8000 | 262 |
| V10 | 8000 < L ≦ 9000 | 207 |
| Sum | | 6,984 |

4-1-2 Experimental Results

In these experiments, two clustering factors (geometric and semantic factors) were considered so as to cluster the MDSs. Further, VPP, EPP and PPC, which are the evaluation parameters, were used in the experiments to measure clustering quality on the geometric characteristics of segments and clusters.

The semantic relationship between points in the segment was measured by using the mean distance MeanDist between consecutive points in the segments in addition to the geometric characteristics.

The summation $DistSum_{VS}$ of the Euclidean distances between consecutive points in a segment VS having k points, $P_j$ for j=1,2, . . . , k, is defined as the following Equation [27].

$$DistSum_{vs} = \sum_{1 \leq n \leq p} dist(P_j, P_{j+1}) \qquad [27]$$

If an arbitrary MDS S is comprised of p segments $VS_h$ for h=1,2, . . . , p, the MeanDist for S is defined as Equation [28] below.

$$MeanDist_s = \frac{\sum_{1 \leq h \leq p} DistSum_{vs_h}}{\sum_{1 \leq h \leq p} (VS_p \cdot HR \cdot k - 1)} \qquad [28]$$

In the experiments, the methods proposed in the present invention and a conventional marginal cost (MCOST) method were compared with each other. Results by the segmentation and clustering proposed in the present invention were respectively denoted as V_SEQ and V_CL, while the result by the MCOST method was denoted as MCOST.

Figure 6:
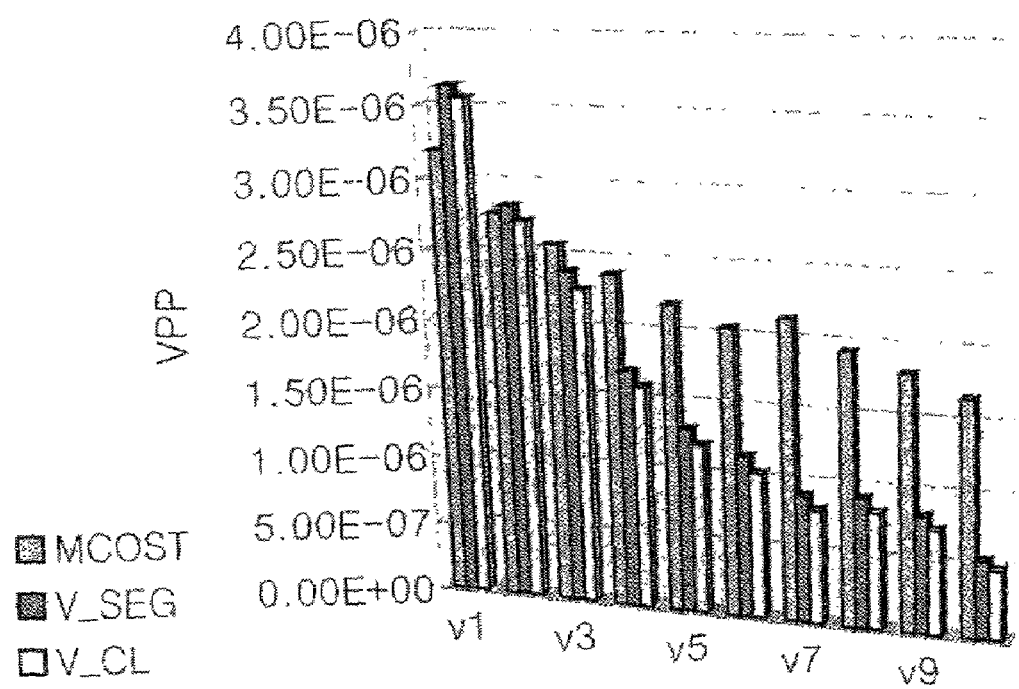
FIG. 6 is a graph showing the comparison of volume per point (VPP) of hyper-rectangles generated by each algorithm for video data having different lengths.

FIG. 6 is a graph showing the comparison of volume per point (VPP) of hyper-rectangles generated by each algorithm with respect to video data having different lengths, and the comparison results are described as follows.

Referring to FIG. 6, it can be seen that as the length of the video clip was increased, VPP of each of V_SEQ and the V_CL was decreased more sharply than that of the MCOST. That is, VPP of the V_CL was 29 to 42% of that of MCOST in case of long sequences, for example, v7 to v10. This is because the proposed present invention reflects characteristics of an individual sequence very well during the segmentation process. In other words, a unit hyper-cube used for getting geometric bounding condition in the segmentation process is likely to be dense as the length of sequence is increased.

This is based on the phenomenon that as the video clip becomes longer, a video clip has higher probability to have similar segments. For example, a long news video clip may have many similar scenes in which the same anchor appears. Further, because the volume of the video clip is used as a bounding threshold for segmentation, if the unit hyper-cube of the video clip becomes dense, it is proper that the video clip has dense segments. In addition, the present invention proposed here deals with outliers properly, thus allowing the present invention to contribute to the generation of dense segments.

As another view, for short sequences (for example, v1) VPP of each of V_SEQ and V_CL was larger than that of MCOST. The unit hyper-rectangle of the video clip having a few segments (2 to 4) may occupy large space according to conditions if the segments are spatially located far from each other. That is, a sparse unit-cube causes the video clip to have sparse segments by the segmentation algorithm.

From the viewpoint of the volume factor, it was shown that the proposed present invention was more efficient than the conventional MCOST with respect to video clips longer than approximately 500 frames. Further, most video clips are really longer than 500 frames.

On the other hand, it can be seen that VPP of V_CL was better than that of V_SEQ.

4-1-2-2 Edge Per Point (EPP)

Figure 7:
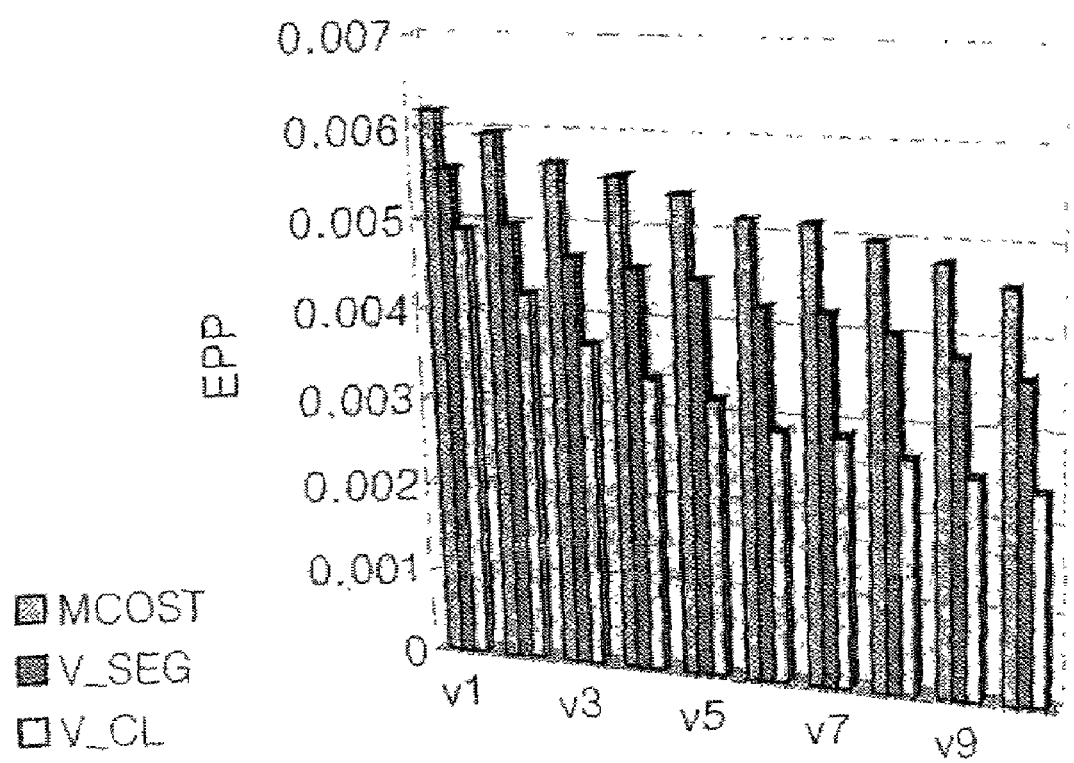
FIG. 7 is a graph showing the comparison of edge per point (EPP) of hyper-rectangles generated by each algorithm for video data having different lengths.

FIG. 7 is a graph showing the comparison of edge per point (EPP) of hyper-rectangles generated by each algorithm with respect to video data having different lengths, and the comparison results are described as follows.

FIG. 7 shows the considerable difference between MCOST, V_SEQ and V_CL with respect to the edge of the hyper-rectangle per point. EPP of the V_CL was 52 to 79% of that of MCOST, and EPP of V_SEQ was 78 to 89% of that of MCOST. Such enhancement results are due to the consideration of the edge length, which is one of important clustering factors, as well as the volume in the present invention.

Further, the proposed invention handles outliers appropriately, such that the enhancement results can be obtained. As the length of video clip becomes increases, EPP of each of V_SEQ and V_CL decreases, which is due to the same reason as the case of VPP. Referring to FIG. 7, EPP of V_CL was 66 to 88% of that of V_SEQ. On the contrary, it shows that VPP of V_CL was slightly enhanced compared to that of V_SEQ, which indicates that merging segments in the sequence clustering process considerably improves EPP rather than VPP.

4-1-2-3 The Number of Points Per Cluster (PPC)

Figure 8:
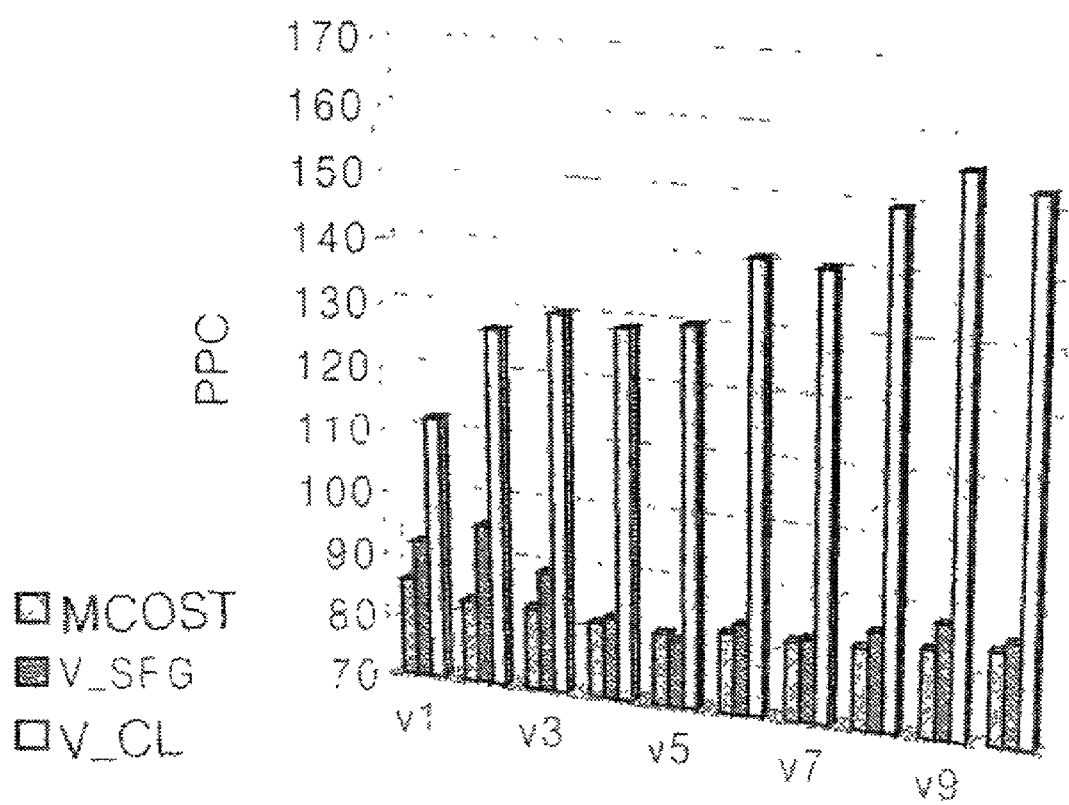
FIG. 8 is a graph showing the comparison of the number of points per cluster (PPC) of hyper-rectangles generated by each algorithm for video data having different lengths.

FIG. 8 is a graph showing the comparison of the number of points per cluster (PPC) of hyper-rectangles generated by each algorithm with respect to video data having different lengths, and the comparison results are described as follows.

FIG. 8 shows the number of points per cluster in relation to VPP and EPP described above, where PPC of the V_SEQ was slightly improved over all video data in comparison with MCOST. However, the clustering process for merging a plurality of segments into one cluster enhances PPC greatly. That is, PPC of V_CL was 1.3 to 1.85 times better than that of MCOST.

Consequently, the experimental results related to VPP, EPP and PPC lead to the conclusion that the prevent invention generates clusters denser than MCOST with respect to the volume and the edge. Further, the densities of clusters become higher as video clips become longer.

4-1-2-4 Mean Distance Between Points in Segment MeanDist

Figure 9:
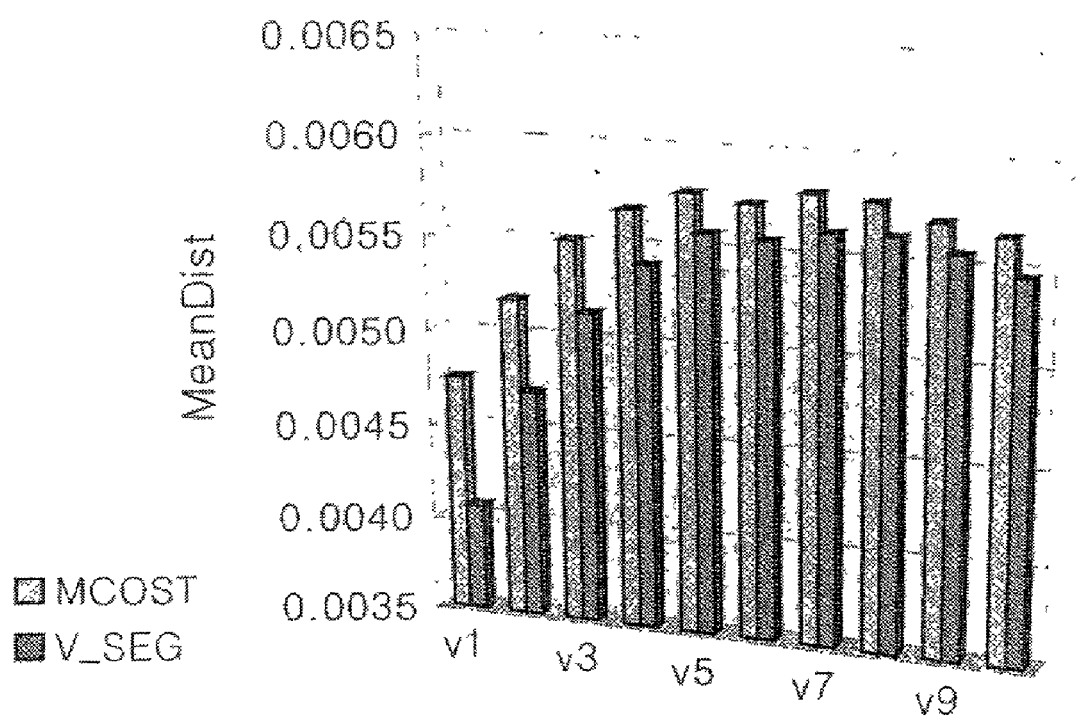
FIG. 9 is a graph showing the comparison of the mean distance (MeanDist) between points in each segment of hyper-rectangles generated by each algorithm for video data having different lengths.

FIG. 9 is a graph showing the comparison of the mean distance (MeanDist) between points in the segment of hyper-rectangles generated by each algorithm with respect to video data having different lengths, and the mean distance comparison results are described as follows.

The small value of the mean distance MeanDist between points in the segment indicates that points in segments are semantically closer than the large value of MeanDist. Referring to FIG. 9, MeanDist of V_SEQ was 85 to 97% of that of MCOST over all video data, which indicates that segments produced by the proposed present invention have a closer semantic relationship between their points than those produced by MCOST. Such an improved result is due to the consideration of the semantic bounding condition as an important clustering factor in the proposed present invention. Comparatively, the conventional MCOST does not consider the semantic bounding condition.

4-1-2-5 Ratio of Outliers

Figure 10:
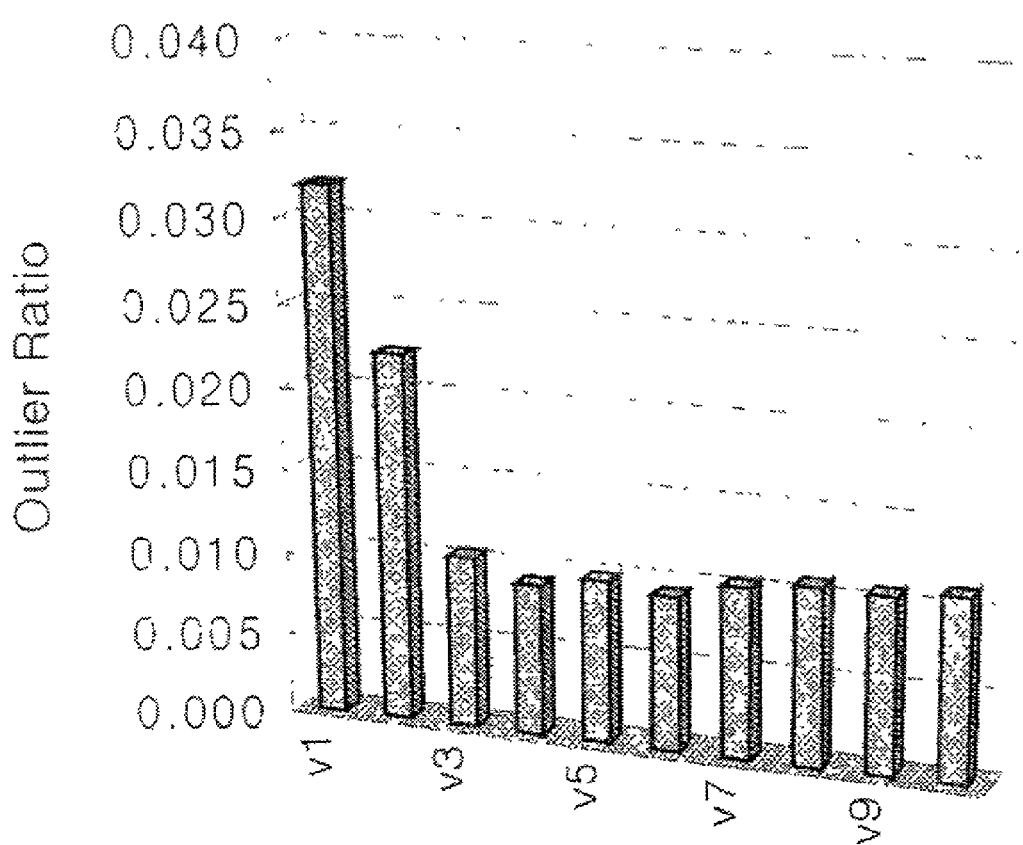
FIG. 10 is a graph showing the comparison of the rate of outliers of hyper-rectangles generated by each algorithm for video data having different lengths.

FIG. 10 is a graph showing the comparison of the ratio of outliers of hyper-rectangles generated by each algorithm with respect to video data having different lengths, and the comparison results are described as follows.

FIG. 10 shows the ratio of the number of outliers versus the number of total points in sequences. In order to determine the outliers, the parameter minPts was set to 5 here. This constant is regarded as a relatively reasonable value in video application domain, which is because it takes approximately ⅙ second to play *five-frame* video and the segments with frames less than five are nearly meaningless in *reality*. T*he* playing time of ⅙ second may not be perceived well by the human visual *system*.

Referring to FIG. 10, the ratio starts from 3.2% for short sequences and it shows an almost steady rate of 1.0% for long sequences longer than 1000 frames. The outliers are treated separately from clusters for similarity search processing.

As described above, the present invention provides an apparatus and method for Hyper-rectangle based multidimensional data segmentation and clustering, which have advantages described as follows.

The present invention, which is related to the segmentation and clustering of MDS's, first proposes clustering factors considering geometric and semantic characteristics of clusters to handle such segmentation and clustering. Then, the measures for evaluating the clustering quality are defined. Based on these clustering factors and measures, the present invention proposes an effective clustering method having the following desirable properties.

First, the present invention can maintain and manage the temporal and semantic relationship between elements in a cluster.

Second, the present invention can generate dense clusters which satisfy the predefined criteria, with respect to the volume and edge.

Third, the present invention can identify outliers properly and can deal with the outliers differently from clusters in order to increase efficiency of later retrieval operations.

Fourth, the present invention is designed such that most input parameters required for clustering are determined using the characteristics of the sequence, not supplied by the user.

Further, the present invention can evaluate the clustering quality by performing experiments using various video data with respect to methods proposed in the present invention. In the experiments, it is confirmed that methods proposed in present invention have considerable efficiency with respect to VPP, EPP, PPC and MeanDist.

Consequently, the present invention is advantageous in that similarity search method for MDS's can be more efficiently performed based on the segments and clusters.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for performing similarity searches using hyper-rectangle based multidimensional data segmentation, comprising:

a multidimensional data sequence $S_i$ comprising one or more multidimensional data embodied in a computer readable storage medium, wherein said computer readable storage medium comprises:

data segmentation means for segmenting a multidimensional data sequence $S_i$ comprising the one or more multidimensional data; and means for determining similarity between an inputted query data and the multidimensional data sequence $S_i$;

wherein the data segmentation means comprises:

threshold calculation means for inputting the multidimensional data sequence $S_i$ and a minimum number of points per segment minPts, and calculating a bounding threshold value for a volume and a bounding threshold value for an edge using a unit hyper-cube occupied by a single point in an n-dimensional unit space, if points are uniformly distributed in a hyper-rectangle which is a minimum bounding rectangle containing all points in the multidimensional data sequence $S_i$;

segment generation means for initializing a segment set and an outlier set to empty sets and generating a current segment using a first point of the multidimensional data sequence $S_i$;

geometric condition determination means for determining whether at least one next point of the multidimensional data sequence $S_i$ satisfies a geometric condition using the bounding threshold value for the volume and the bounding threshold value for the edge;

segment merging means for merging the at least one next point of the multidimensional data sequence $S_i$ into the current segment if the geometric condition is satisfied; and segment updating means for including the current segment in the segment set and re-generating a new current segment using the at least one next point of the multidimensional data sequence $S_i$, if the geometric condition is not satisfied and a number of points contained in the current segment exceeds the minimum number of points per segment minPts.

2. The apparatus according to claim 1, wherein the bounding threshold value for the volume is calculated by the following Equation [1]:

$$\tau_{vol} = e^n \quad [1]$$

where e is the length of a side of the unit hyper-cube and n is the number of dimensions of a current hyper-rectangle.

3. The apparatus according to claim 1, wherein the bounding threshold value for the edge is calculated by the following Equation [2]:

$$\tau_{edge} = 2^{n-1} \cdot n \cdot e \quad [2]$$

where e is the length of a side of the unit hyper-cube and n is the number of dimensions of a current hyper-rectangle.

4. The apparatus according to claim 1, wherein the geometric condition determination means determines that the geometric condition is satisfied if the following Equation [3] is satisfied:

$$\Delta \text{Vol}(VS,P) \leq \tau_{vol} \wedge \Delta \text{Edge}(VS,P) \leq \tau_{edge} \quad [3]$$

where VS is a current segment VS; P is a segment P generated by merging the at least one next point of the multidimensional data sequence $S_i$ into the current segment VS; $\Delta\text{Vol}(VS,P)$ is a difference between a volume of the current segment VS and a volume of the segment P generated by merging the at least one next point of the multidimensional data sequence $S_i$ into the current segment VS; $\Delta\text{Edge}(VS,P)$ is a difference between an edge length of the current segment VS and an edge length of the segment generated by merging the at least one next point of the multidimensional data sequence $S_i$ into the current segment VS; $\tau_{vol}$ is the bounding threshold value for the volume; and $\tau_{edge}$ is the bounding threshold value for the edge.

5. An apparatus for performing similarity searches using hyper-rectangle based multidimensional data segmentation, comprising:
 a multidimensional data sequence $S_i$ comprising one or more multidimensional data embodied in a computer readable storage medium, wherein said computer readable storage medium comprises:
 data segmentation means for segmenting the multidimensional data sequence $S_i$ comprising the one or more multidimensional data; and
 means for determining similarity between an inputted query data and the multidimensional data sequence $S_i$;
 wherein the data segmentation means comprises:
 threshold calculation means for inputting the multidimensional data sequence $S_i$ and a minimum number of points per segment minPts, and calculating a bounding threshold value for a volume and a bounding threshold value for a semantic factor using a unit hyper-cube occupied by a single point in an n-dimensional unit space, if points are uniformly distributed in a hyper-rectangle which is a minimum bounding rectangle containing all points in the multidimensional data sequence $S_i$;
 segment generation means for initializing a segment set and an outlier set to empty sets and generating a current segment using a first point of the multidimensional data sequence $S_i$;
 geometric and semantic condition determination means for determining whether at least one next point of the multidimensional data sequence $S_i$ satisfies a geometric condition and a semantic condition using the bounding threshold value for the volume and the bounding threshold value for the semantic factor;
 segment merging means for merging at least one next point of the multidimensional data sequence $S_i$ into the current segment if the geometric condition is satisfied; and
 segment updating means for including the current segment in the segment set and re-generating a new current segment using the at least one next point of the multidimensional data sequence $S_i$, if the geometric condition is not satisfied and a number of points contained in the current segment exceeds the minimum number of points per segment minPts.

6. The apparatus according to claim 5, wherein the bounding threshold value for the volume is calculated by the following Equation [4]:

$$\tau_{vol} = e^n \quad [4]$$

where e is the length of a side of the unit hyper-cube and n is the number of dimensions of a current hyper-rectangle.

7. The apparatus according to claim 5, wherein the bounding threshold value for the semantic factor is a mean distance between one or more pairs of adjacent points contained in the multidimensional data sequence $S_i$.

8. The apparatus according to claim 5, wherein the geometric and semantic condition determination means determines that the geometric condition and the semantic condition are satisfied if the following Equation [5] is satisfied:

$$\Delta\text{Vol}(VS,P) \leq \tau_{vol} \wedge \text{dist}(P_k, P_{k+1}) \leq \tau_{dist} \quad [5]$$

where VS is a current segment VS; P is a segment P generated by merging the at least one next point of the multidimensional sequence $S_i$ into the current segment VS; $P_k$ is a $k^{th}$ point in the segment generated by merging the at least one next point of the multidimensional data sequence $S_i$; $P_{k+1}$ is a $(k+1)^{th}$ point in the segment generated by merging the at least one next point of the multidimensional data sequence $S_i$; $\Delta\text{Vol}(VS,P)$ is a difference between a volume of the current segment VS and a volume of the segment P generated by merging the at least one next point of the multidimensional data sequence $S_i$ into the current segment VS; dist $(P_k, P_{k+1})$ is a distance between two adjacent points in the segment generated by merging the at least one next point of the multidimensional data sequence $S_i$; $\tau_{vol}$ is the bounding threshold value for the volume; and $\tau_{dist}$ is the bounding threshold value for the semantic factor.

9. An apparatus for using hyper-rectangle based multidimensional data segmentation in performing similarity searches, comprising:
 a multidimensional data sequence $S_i$ comprising one or more multidimensional data embodied in a computer readable storage medium, wherein said computer readable storage medium comprises:
 data segmentation means for segmenting the multidimensional data sequence $S_i$ comprising the one or more multidimensional data; and
 means for determining similarity between an inputted query data and the multidimensional data sequence $S_i$;
 wherein the data segmentation means comprises:
 threshold calculation means for inputting the multidimensional sequence data $S_i$ and a minimum number of points per segment minPts, and calculating a bounding threshold value for a volume, a bounding threshold value for an edge and a bounding threshold value for a semantic factor using a unit hyper-cube occupied by a single point in n-dimensional unit space, if points are uniformly distributed in a hyper-rectangle which is a minimum bounding rectangle containing all points in the multidimensional data sequence $S_i$;
 segment generation means for initializing a segment set and an outlier set to empty sets and generating a current segment using a first point of the multidimensional data sequence $S_i$;

geometric and semantic condition determination means for determining whether at least one next point of the multidimensional sequence $S_i$ satisfies a geometric condition and a semantic condition using the bounding threshold values for the volume, the edge and the semantic factor;

segment merging means for merging the at least one next point of the multidimensional sequence $S_i$ into the current segment if the geometric condition and the semantic condition are satisfied; and segment updating means for including the current segment in the segment set and re-generating a new current segment using the at least one next point of the multidimensional data sequence $S_i$, if the geometric condition and the semantic condition are not satisfied and a number of points contained in the current segment exceeds the minimum number of points per segment minPts.

10. The apparatus according to claim 9, wherein the geometric and semantic condition determination means determines that the geometric condition and the semantic condition are satisfied if the following Equation [8] is satisfied:

$$\Delta \text{Vol}(VS,P) \leq \tau_{vol} \hat{\ } \text{Edge}(VS,P) \leq \tau_{edge} \hat{\ } \text{dist}(P_k, P_{k+1}) \leq \tau_{dist} \qquad [8]$$

where VS is a current segment VS; P is a segment P generated by merging the at least one next point of the multidimensional sequence $S_i$ into the current segment VS; $P_k$ is a $k^{th}$ point in the segment generated by merging the at least one next point of the multidimensional data sequence $S_i$; $P_{k+1}$ is a $(k+1)^{th}$ point in the segment generated by merging the at least one next point of the multidimensional data sequence $S_i$; $\Delta \text{Vol}(VS,P)$ is a difference between a volume of the current segment VS and a volume of the segment P generated by merging the at least one next point of the multidimensional data sequence $S_i$ into the current segment VS; $\Delta \text{Edge}(VS,P)$ is a difference between an edge length of the current segment VS and an edge length of the segment P generated by merging the at least one next point of the multidimensional data sequence $S_i$ into the current segment VS; dist $(P_k, P_{k+1})$ is a distance between two adjacent points in the segment generated by merging the at least one next point of the multidimensional sequence $S_i$; $\tau_{vol}$ is the bounding threshold value for the volume; $\tau_{edge}$ is the bounding threshold value for the edge; and $\tau_{dist}$ is the bounding threshold value for the semantic factor.

11. A comDuter-implemented method for using hyper-rectangle based multidimensional data segmentation in performing similarity searches, comprising the steps of:

segmenting a multidimensional data sequence $S_i$ comprising one or more multidimensional data embodied in a computer readable storage medium; and determining similarity between an inputted query data and the multidimensional data sequence $S_i$;

wherein the step of segmenting the multidimensional data sequence $S_i$ comprises:

inputting the multidimensional data sequence $S_i$ and a minimum number of points per segment minPts, and calculating a bounding threshold value for a volume and a bounding threshold value for an edge using a unit hyper-cube occupied by a single point in an n-dimensional unit space, if points are uniformly distributed in a hyper-rectangle which is a minimum bounding rectangle containing all points in the multidimensional data sequence $S_i$;

initializing a segment set and an outlier set to empty sets and generating a current segment using a first point of the multidimensional data sequence $S_i$;

determining whether at least one next point of the multidimensional data sequence $S_i$ satisfies a geometric condition using the bounding threshold values for the volume and the edge;

merging the at least one next point of the multidimensional data sequence $S_i$ into the current segment if the geometric condition is satisfied; and including the current segment in the segment set and updating the segment set by re-generating a new current segment using the at least one next point of the multidimensional data sequence $S_i$, if the geometric condition is not satisfied and a number of points contained in the current segment exceeds the minimum number of points per segment minPts.

12. The segmentation method according to claim 11, wherein at the geometric condition determination step, it is determined that the geometric condition is satisfied if the following Equation [23] is satisfied:

$$\Delta \text{Vol}(VS,P) \leq \tau_{vol} \hat{\ } \Delta \text{Edge}(VS,P) \leq \tau_{edge} \qquad [23]$$

where VS is a current segment VS; P is a segment P generated by merging the at least one next point of the multidimensional sequence $S_i$ into the current segment VS; $\Delta \text{Vol}(VS,P)$ is a difference between a volume of the current segment VS and a volume of the segment P generated by merging the at least one next point of the multidimensional data sequence $S_i$ into the current segment VS; $\Delta \text{Edge}(VS,P)$ is a difference between an edge length of the current segment VS and an edge length of the segment generated by merging the at least one next point of the multidimensional data sequence $S_i$ into the current segment VS; $\tau_{vol}$ is the bounding threshold value for the volume; and $\tau_{edge}$ is the bounding threshold value for the edge.

13. A computer-implemented method for using hyper-rectangle based multidimensional data segmentation in performing similarity searches, comprising the steps of:

segmenting a multidimensional data sequence $S_i$ comprising one or more multidimensional data embodied in a computer readable storage medium; and determining similarity between an inputted query data and the multidimensional data sequence $S_i$;

wherein the step of segmenting a multidimensional data sequence $S_i$ comprises:

inputting the multidimensional data sequence $S_i$ and a minimum number of points per segment minPts and calculating a bounding threshold value for a volume and a bounding threshold value for a semantic factor using a unit hyper-cube occupied by a single point in n-dimensional unit space, if points are uniformly distributed in a hyper-rectangle which is a minimum bounding rectangle containing all points in the multidimensional data sequence $S_i$;

initializing a segment set and an outlier set to empty sets and generating a current segment using a first point of the multidimensional data sequence $S_i$;

determining whether at least one next point of the multidimensional data sequence $S_i$ satisfies a geometric condition and a semantic condition using the bounding threshold values for the volume and the semantic factor;

merging the at least one next point of the multidimensional data sequence $S_i$ into the current segment if the geometric condition and the semantic condition are satisfied; and including the current segment in the segment set and updating the segment set by re-generating a new current segment using the at least one next point of the multidimensional data sequence $S_i$, if the geometric and semantic conditions are not satisfied and a number of points contained in the current segment exceeds the minimum number of points per segment minPts.

14. The segmentation method according to claim 13, wherein at the geometric and semantic condition determination step, it is determined that the geometric condition and the semantic condition are satisfied if the following Equation [25] is satisfied:

$$\Delta \text{Vol}(VS,P) \leq \tau_{vol} \hat{} \text{dist}(P_k, P_{k+1}) \leq \tau_{dist} \quad [25]$$

where VS is a current segment VS; P is a segment generated by merging the at least one next point of the multidimensional sequence $S_i$ into the current segment VS; $P_k$ is a $k^{th}$ point in the segment generated by merging the at least one next point of the multidimensional sequence $S_i$; $P_{k+1}$ is a $(k+1)^{th}$ point in the segment generated by merging the at least one next point of the multidimensional sequence $S_i$; $\Delta \text{Vol}(VS,P)$ is a difference between a volume of the current segment VS and a volume the segment P generated by merging the at least one next point of the sequence $S_i$ into the current segment VS; dist $(P_k, P_{k+1})$ is a distance between two adjacent points in the segment generated by merging the at least one next point of the multidimensional sequence $S_i$; $\tau_{vol}$ is the bounding threshold value for the volume; and $\tau_{vol}$ is the bounding threshold value for the semantic factor.

15. A computer-implemented method for using hyper-rectangle based multidimensional data segmentation in performing similarity searches, comprising the steps of:

segmenting a multidimensional data sequence $S_i$ comprising one or more multidimensional data embodied in a computer readable storage medium; and determining similarity between an inputted query data and the multidimensional data sequence $S_i$;

wherein the step of segmenting the multidimensional data sequence $S_i$ comprises:

inputting the multidimensional data sequence $S_i$ and a minimum number of points per segment minPts, and calculating a bounding threshold value for a volume, a bounding threshold value for an edge and a bounding threshold value for a semantic factor using a unit hyper-cube occupied by a single point in an n-dimensional unit space, if points are uniformly distributed in a hyper-rectangle which is a minimum bounding rectangle containing all points in the multidimensional data sequence $S_i$;

initializing a segment set and an outlier set to empty sets and generating a current segment using a first point of the multidimensional data sequence $S_i$;

determining whether at least one next point of the multidimensional data sequence $S_i$ satisfies a geometric condition and a semantic condition using the bounding threshold values for the volume, the edge and the semantic factor;

merging the at least one next point of the multidimensional data sequence $S_i$ into the current segment if the geometric condition and the semantic condition are satisfied; and including the current segment in the segment set and updating the segment set by re-generating a new current segment using the at least one next point of the multidimensional data sequence $S_i$, if the geometric and semantic conditions are not satisfied and a number of points contained in the current segment exceeds the minimum number of points per segment minPts.

16. The segmentation method according to claim 15, wherein at the geometric and semantic condition determination step, it is determined that the geometric condition and the semantic condition are satisfied if the following Equation [28] is satisfied:

$$\Delta \text{Vol}(VS,P) \leq \tau_{vol} \hat{} \text{Edge}(VS,P) \leq \tau_{edge} \hat{} \text{dist}(P_k, P_{k+1})$$
$$\leq \tau_{dist} \quad [28]$$

where VS is a current segment VS; P is a segment P generated by merging the at least one next point of the multidimensional sequence $S_i$ into the current segment VS; $P_k$ is a $k^{th}$ point in the segment generated by merging the at least one next point of the multidimensional sequence $S_i$; $P_{k+1}$ is a $(k+1)^{th}$ point in the segment generated by merging the at least one next point of the multidimensional sequence $S_i$; $\Delta \text{Vol}(VS,P)$ is a difference between a volume of the current segment VS and a volume of the segment P generated by merging the at least one next point of the sequence $S_i$ into the current segment VS; $\Delta \text{Edge}(VS,P)$ is a difference between an edge length of the current segment VS and an edge length of the segment generated by merging the at least one next point of the multidimensional data sequence $S_i$ into the current segment VS; dist $(P_k, P_{k+1})$ is a distance between two adjacent points in the segment generated by merging the at least one next point of the multidimensional data sequence $S_i$; $\tau_{vol}$ is the bounding threshold value for the volume; and $\tau_{dist}$ is the bounding threshold value for the semantic factor.

* * * * *